United States Patent
Hu et al.

(10) Patent No.: US 11,314,244 B2
(45) Date of Patent: Apr. 26, 2022

(54) SYSTEMS AND METHODS FOR DETERMINING ABNORMAL INFORMATION ASSOCIATED WITH A VEHICLE

(71) Applicant: BEIJING QISHENG SCIENCE AND TECHNOLOGY CO., LTD., Beijing (CN)

(72) Inventors: Zhifeng Hu, Beijing (CN); Tao Fang, Beijing (CN); Yi Zheng, Beijing (CN); Wei Duan, Beijing (CN); Chunyue Tong, Beijing (CN); Chuan Liu, Beijing (CN)

(73) Assignee: BEIJING QISHENG SCIENCE AND TECHNOLOGY CO., LTD., Beijing (CN)

(*) Notice: Subject to any disclaimer, the term of this patent is extended or adjusted under 35 U.S.C. 154(b) by 389 days.

(21) Appl. No.: 16/468,739

(22) PCT Filed: Nov. 30, 2017

(86) PCT No.: PCT/CN2017/114125
§ 371 (c)(1),
(2) Date: Jun. 12, 2019

(87) PCT Pub. No.: WO2018/107978
PCT Pub. Date: Jun. 21, 2018

(65) Prior Publication Data
US 2020/0017155 A1    Jan. 16, 2020

(30) Foreign Application Priority Data

Dec. 12, 2016  (CN) .......................... 201621362967.5
Dec. 12, 2016  (CN) .......................... 201621362969.4
(Continued)

(51) Int. Cl.
*G05B 23/02*   (2006.01)
*B60C 23/04*   (2006.01)
(Continued)

(52) U.S. Cl.
CPC ...... *G05B 23/0283* (2013.01); *B60C 23/0413* (2013.01); *B60C 23/068* (2013.01);
(Continued)

(58) Field of Classification Search
CPC ............... G05B 23/0283; G05B 15/02; G05B 2219/2637; B62H 5/141; B60C 23/0413;
(Continued)

(56) References Cited

U.S. PATENT DOCUMENTS 4,911,257 A    3/1990  Kajimoto et al.
6,109,770 A    8/2000  Choimet et al.
(Continued)

FOREIGN PATENT DOCUMENTS

CN    101144757 A    3/2008
CN    201321123 Y   10/2009
(Continued)

OTHER PUBLICATIONS

Extended European Search Report in European Application No. 17882037.9 dated Nov. 18, 2019, 9 pages.
(Continued)

*Primary Examiner* — Eric Blount
(74) *Attorney, Agent, or Firm* — Metis IP LLC

(57) ABSTRACT

The present disclosure relates to systems and methods for determining abnormal information associated with a vehicle. The systems may perform the methods to obtain real-time information associated with a bicycle and obtain reference information associated with the bicycle. The systems may also perform the methods to determine, based on the real-time information and the reference information, abnormal
(Continued)

information associated with the bicycle, and transmit the abnormal information to a server or a terminal device associated with the bicycle according to a Narrow Band Internet of Things (NB-IoT) technique or a Long Range (LoRa) technique.

18 Claims, 18 Drawing Sheets

(30) Foreign Application Priority Data

| Dec. 19, 2016 | (CN) | 201611179039.X |
|---|---|---|
| Dec. 19, 2016 | (CN) | 201621397930.6 |
| Dec. 28, 2016 | (CN) | 201621461623.X |
| Dec. 28, 2016 | (CN) | 201621463059.5 |
| Dec. 29, 2016 | (CN) | 201611248360.9 |
| Dec. 29, 2016 | (CN) | 201611248372.1 |
| Dec. 29, 2016 | (CN) | 201611249749.5 |
| Dec. 29, 2016 | (CN) | 201621491579.7 |
| May 19, 2017 | (CN) | 201710356189.1 |
| May 19, 2017 | (CN) | 201720567596.2 |

(51) Int. Cl.

| B60C 23/06 | (2006.01) |
|---|---|
| B62H 5/14 | (2006.01) |
| G01B 7/02 | (2006.01) |
| G01B 7/24 | (2006.01) |
| B62J 45/41 | (2020.01) |
| B62J 45/423 | (2020.01) |
| B62J 45/00 | (2020.01) |

(52) U.S. Cl.
CPC ............. *B62H 5/141* (2013.01); *B62J 45/41* (2020.02); *B62J 45/423* (2020.02); *G01B 7/023* (2013.01); *G01B 7/24* (2013.01); *B62J 45/00* (2020.02)

(58) Field of Classification Search
CPC ........ B60C 23/068; G01B 7/023; G01B 7/24; B62J 45/00; B62J 45/40; B62J 45/10
USPC ............................................. 70/233; 340/432
See application file for complete search history.

(56) References Cited

U.S. PATENT DOCUMENTS

| 6,625,523 | B2* | 9/2003 | Campagnolo | G08C 15/06 340/432 |
|---|---|---|---|---|
| 10,109,006 | B2* | 10/2018 | Yan | B62J 99/00 |
| 2004/0235516 | A1 | 11/2004 | Otsuki et al. | |
| 2008/0236293 | A1 | 10/2008 | Meggiolan | |
| 2008/0252038 | A1* | 10/2008 | Blomme | B62K 21/02 280/281.1 |
| 2011/0095769 | A1 | 4/2011 | Wuidart | |
| 2011/0307394 | A1* | 12/2011 | Rzepecki | G06Q 30/0645 705/307 |
| 2012/0041582 | A1 | 2/2012 | Wallace | |
| 2012/0239248 | A1 | 9/2012 | Bobbitt | |
| 2014/0144286 | A1 | 5/2014 | Chen et al. | |
| 2016/0039496 | A1* | 2/2016 | Hancock | G01S 19/19 701/60 |
| 2016/0196701 | A1* | 7/2016 | Strother | G06Q 10/06 701/29.3 |
| 2016/0233755 | A1 | 8/2016 | Bayrakdar | |
| 2016/0241999 | A1 | 8/2016 | Chin et al. | |
| 2017/0043633 | A1* | 2/2017 | Li | B60C 23/006 |
| 2017/0061712 | A1* | 3/2017 | Li | G07C 5/0816 |
| 2018/0118294 | A1* | 5/2018 | Anuth | B62H 5/20 |

FOREIGN PATENT DOCUMENTS

| CN | 101633379 A | 1/2010 |
|---|---|---|
| CN | 102095560 A | 6/2011 |
| CN | 102494894 A | 6/2012 |
| CN | 202329962 U | 7/2012 |
| CN | 102840979 A | 12/2012 |
| CN | 102914359 A | 2/2013 |
| CN | 103032244 A | 4/2013 |
| CN | 103661101 A | 3/2014 |
| CN | 103837075 A | 6/2014 |
| CN | 103941690 A | 7/2014 |
| CN | 203996579 U | 12/2014 |
| CN | 104362969 A | 2/2015 |
| CN | 104443135 A | 3/2015 |
| CN | 104579164 A | 4/2015 |
| CN | 105182941 A | 12/2015 |
| CN | 105539643 A | 5/2016 |
| CN | 103850505 B | 6/2016 |
| CN | 105675306 A | 6/2016 |
| CN | 205499151 U | 8/2016 |
| CN | 205677387 U | 11/2016 |
| EP | 2210807 A1 | 7/2010 |
| EP | 1502093 B1 | 7/2011 |
| EP | 2439810 A2 | 4/2012 |
| GB | 2519343 A | 4/2015 |
| JP | 2001080556 A | 3/2001 |
| JP | 2009064226 | 3/2009 |
| JP | 2011219063 A | 11/2011 |
| JP | 2013141892 A | 7/2013 |
| JP | 2015135601 A | 7/2015 |
| TW | 201103232 A1 | 1/2011 |

OTHER PUBLICATIONS

Mobilock World's First Bike Lock with IoT Connection Based on LoRa Technology, Internet of Things—IoT news, IoT magazine, IoT events, 1 page.
First Office Action in Chinese Application No. 201780076585.7 dated Jun. 19, 2020, 28 pages.
First Office Action in Chinese Application No. 201611179039.X dated Jul. 18, 2018, 19 pages.
First Office Action in Chinese Application No. 201611249749.5 dated May 18, 2018, 10 pages.
International Search Report in PCT/CN2017/114125 dated Feb. 7, 2018, 4 pages.
Written Opinion in PCT/CN2017/114125 dated Feb. 7, 2018, 4 pages.
Notice of Reasons for Refusal in Japanese Application No. 2019-531410 dated Nov. 24, 2021, 5 pages.
Isao Horikoshi, Waiting for 5G is too Late! Around IoT Communication, The Old vs. The New, Nikkei Communication, Nikkei BP, No. 627, 2016, 14 pages.
Koji Fujii, SIGFOX, LoRa and the Wireless Factory, Mastering the Wireless IoT, Telecommunication, RIC Telecom, No. 8, 2016, 29 pages.

* cited by examiner

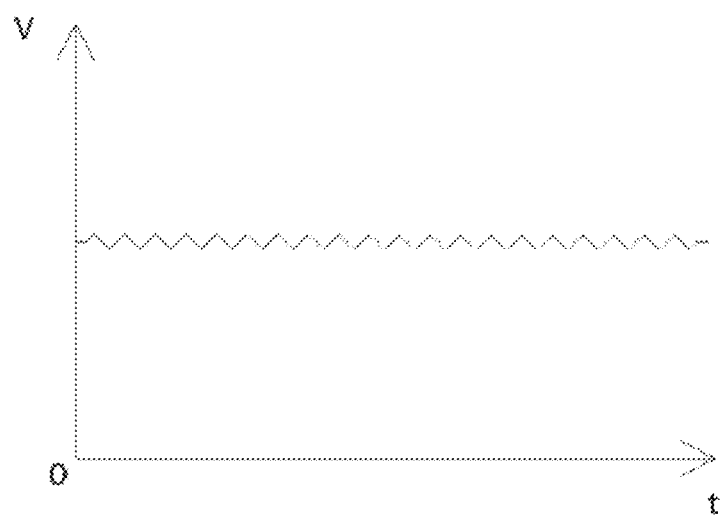
FIG. 8-A
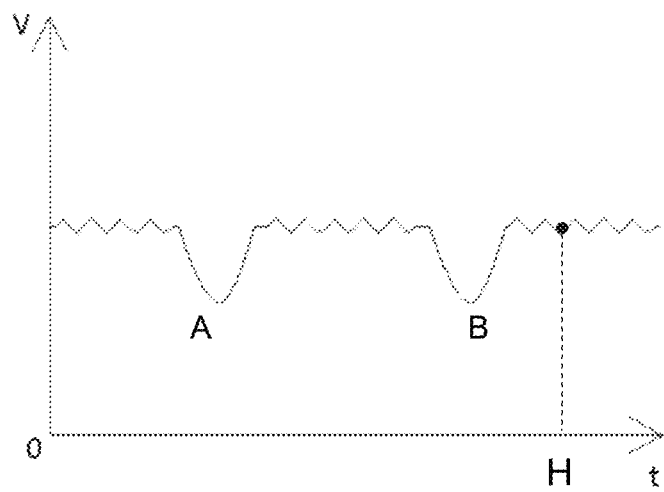
FIG. 8-B
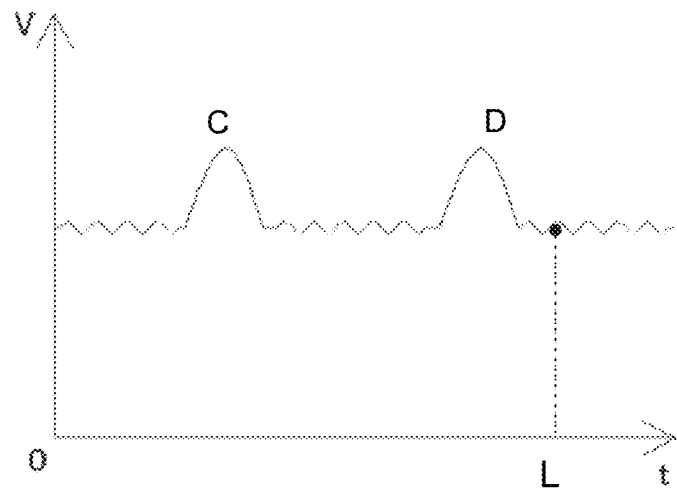
FIG. 8-C

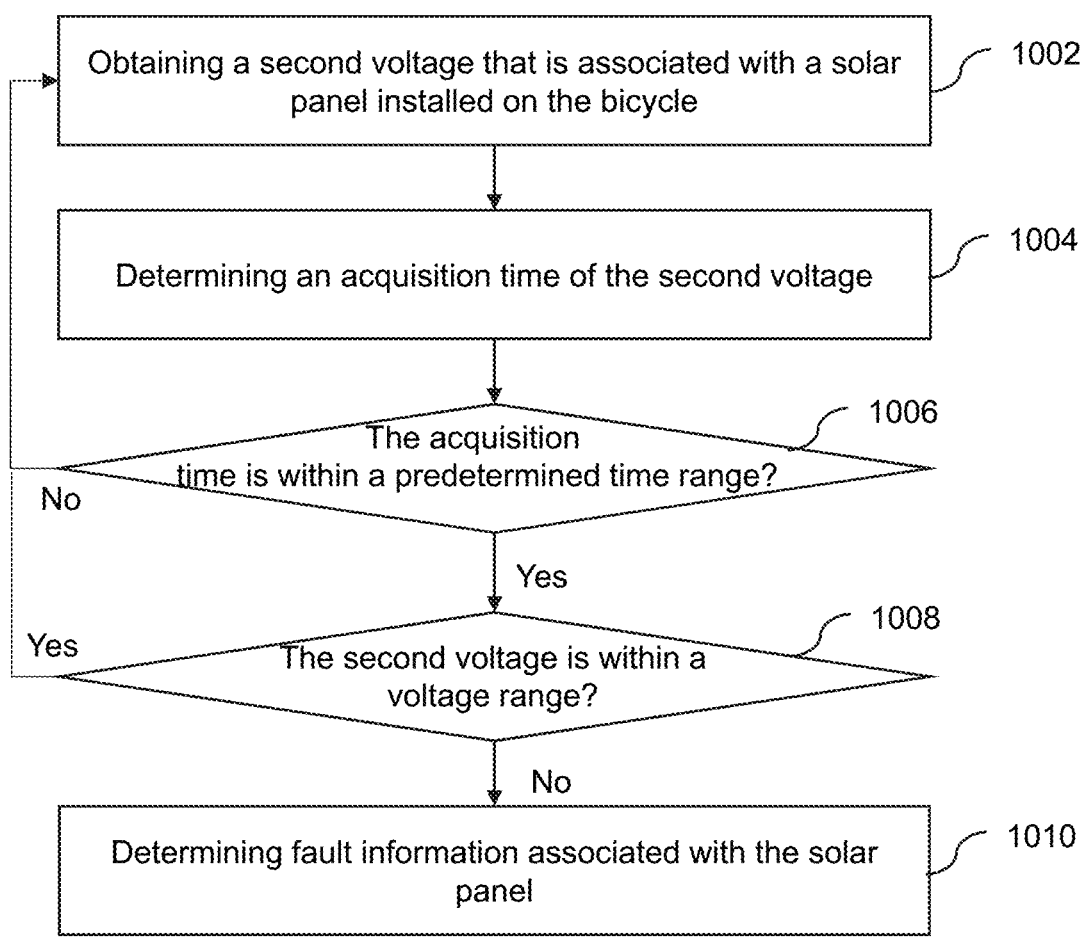
FIG. 10-A

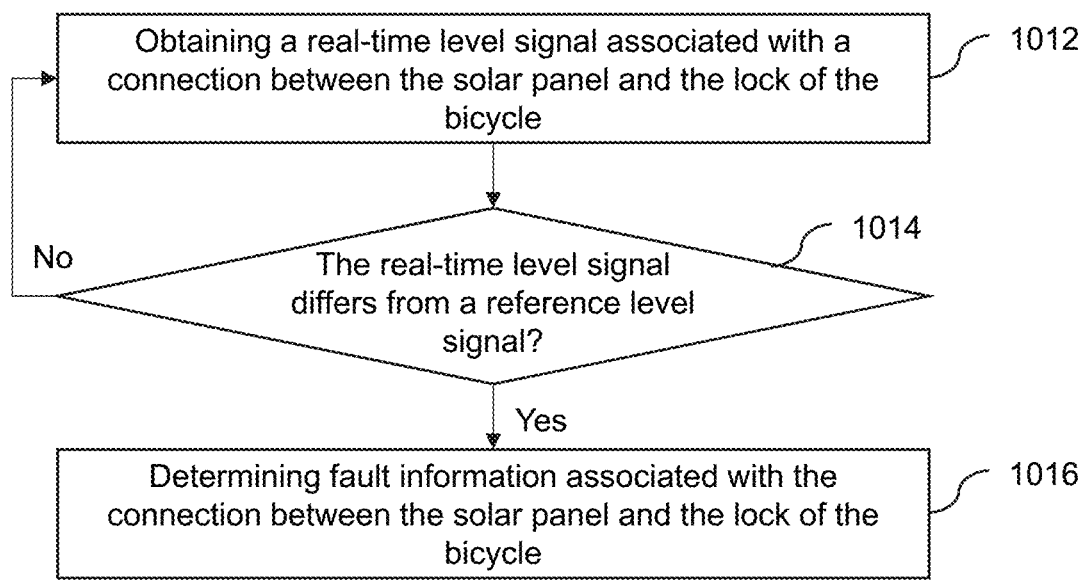
FIG. 10-B

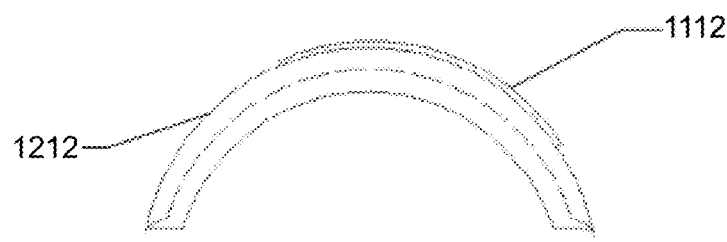
FIG. 12-A
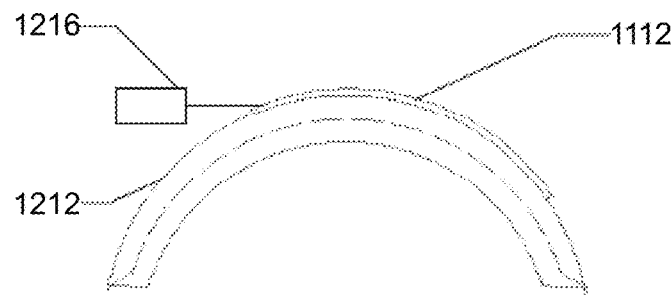
FIG. 12-B
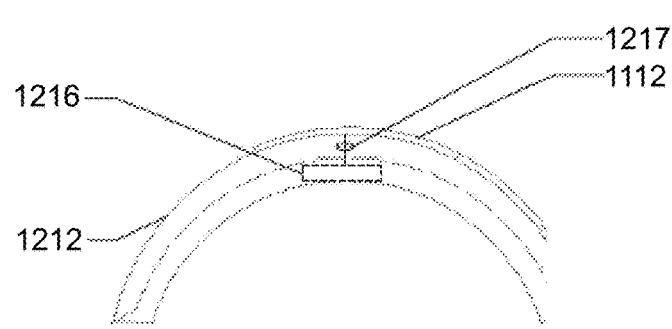
FIG. 12-C
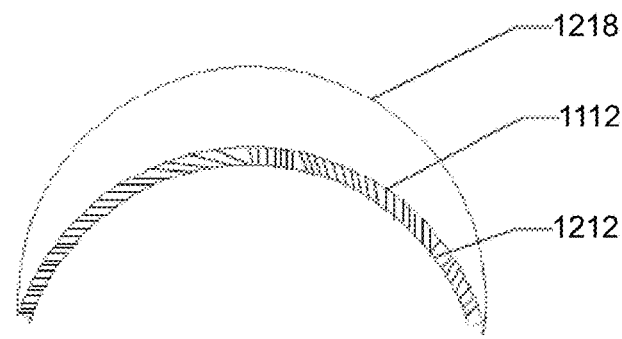
FIG. 12-D
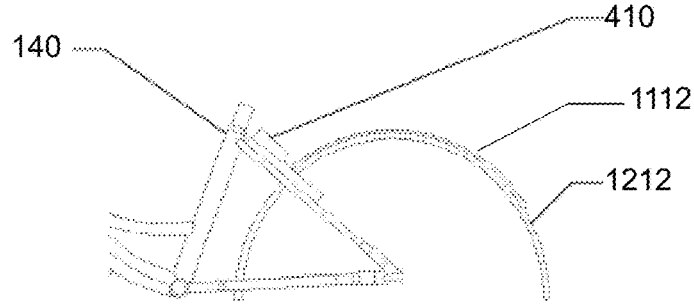
FIG. 12-E

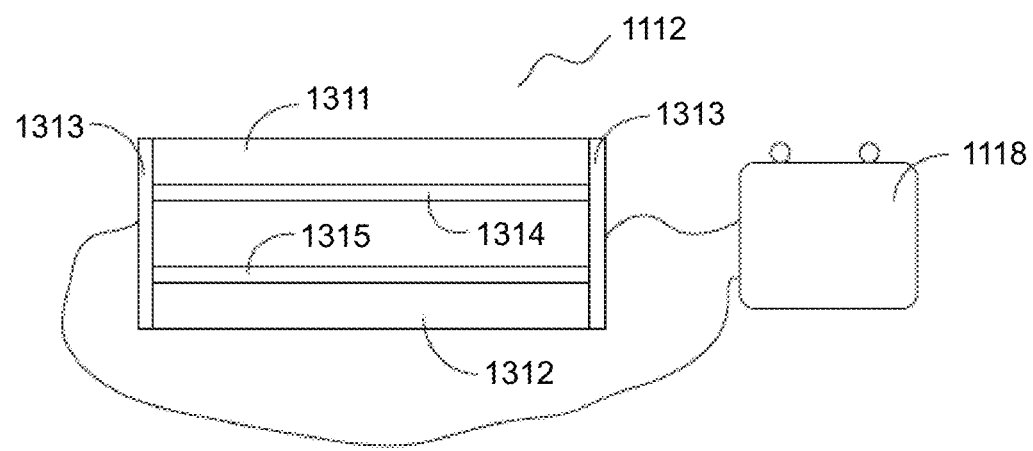
FIG. 13-A
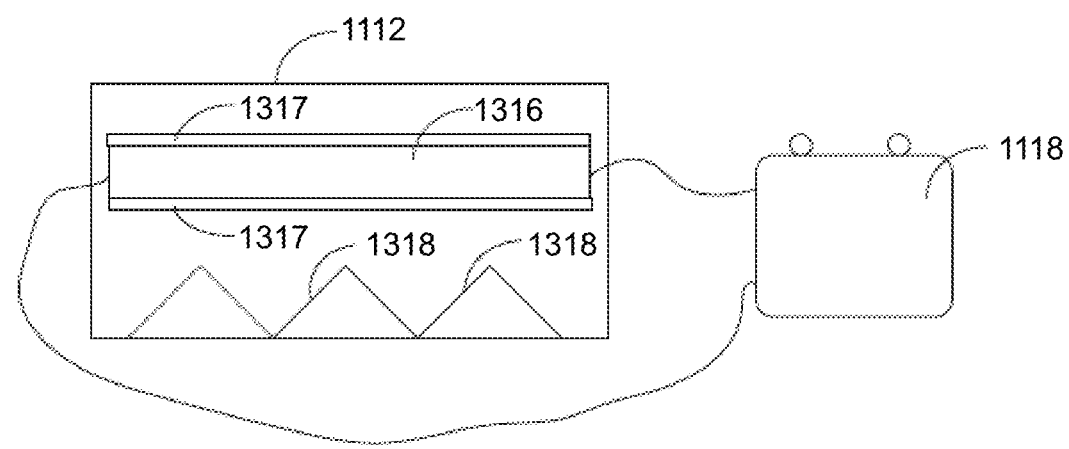
FIG. 13-B

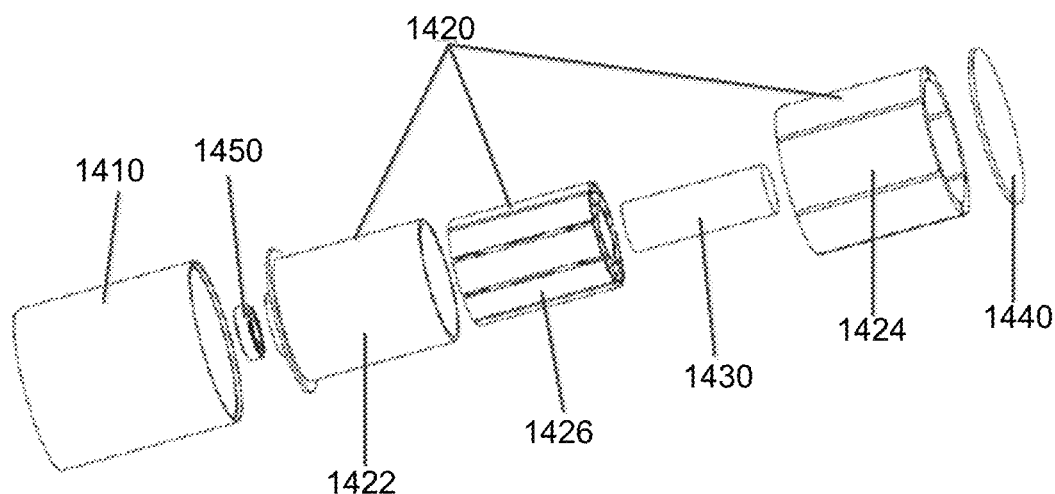
FIG. 14-A
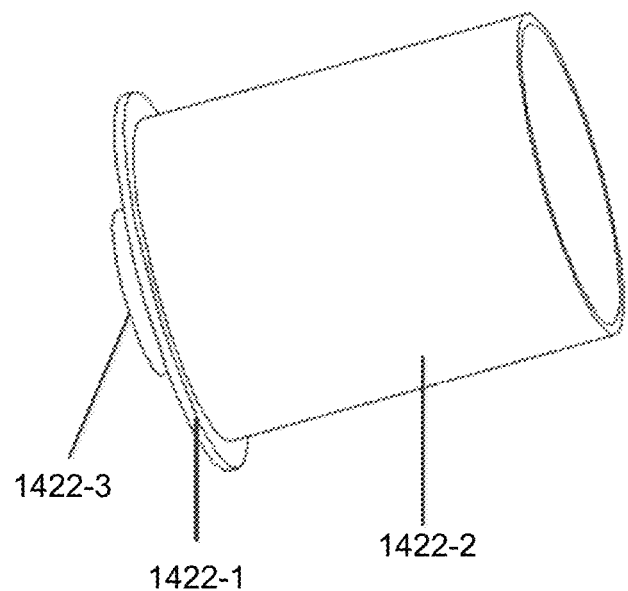
FIG. 14-B

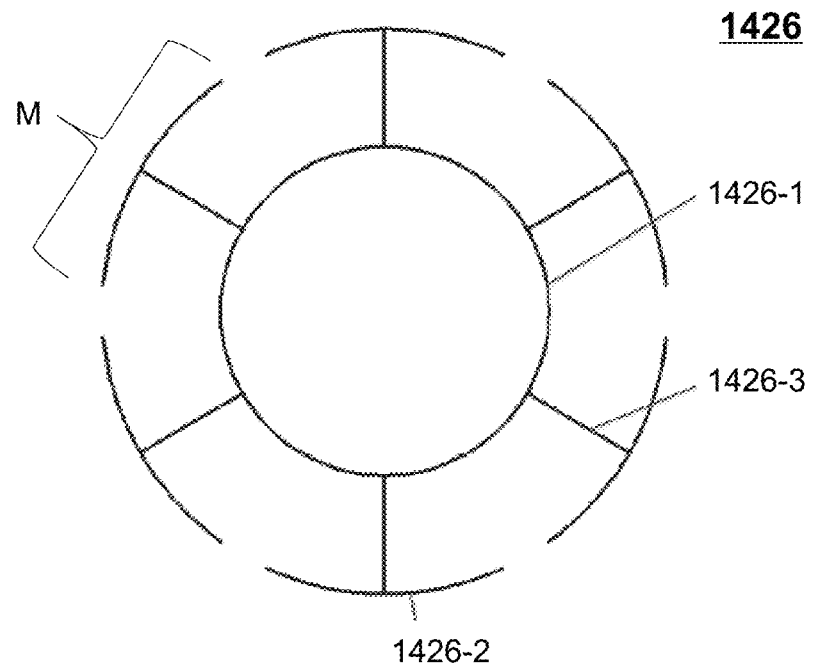
FIG. 14-C
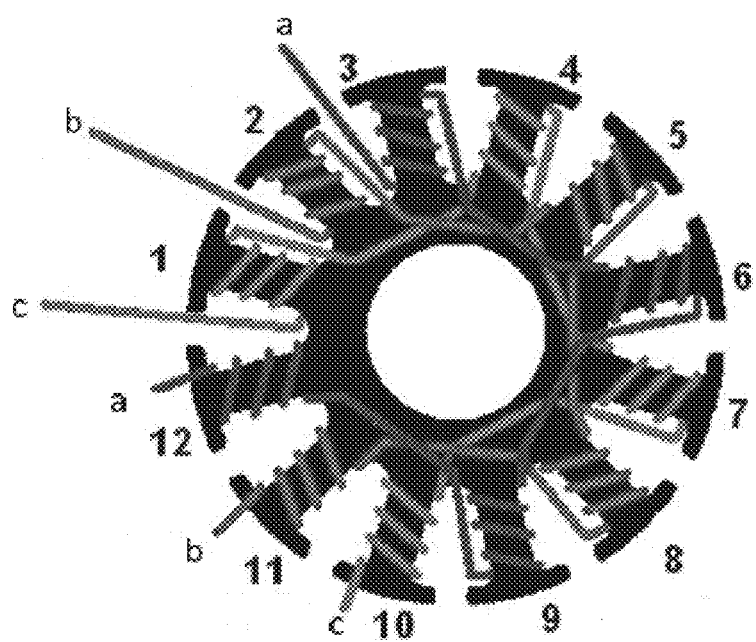
FIG. 14-D

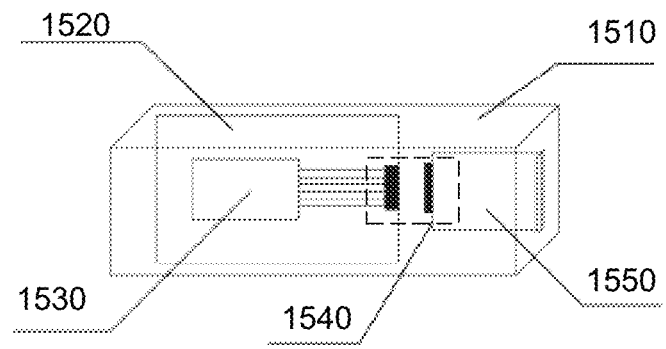
FIG. 15-A
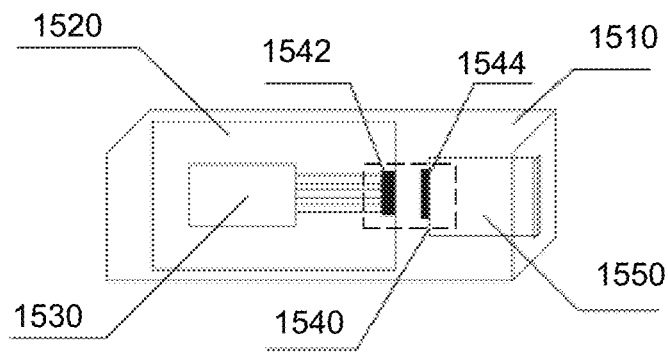
FIG. 15-B
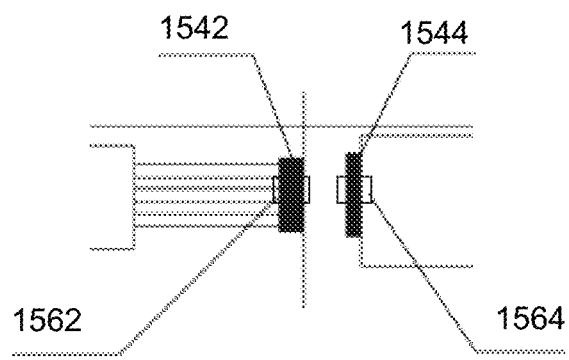
FIG. 15-C

SYSTEMS AND METHODS FOR DETERMINING ABNORMAL INFORMATION ASSOCIATED WITH A VEHICLE

CROSS-REFERENCE TO RELATED APPLICATIONS

This application is a U.S. national stage under 35 U.S.C. § 371 of International Application No. PCT/CN2017/114125, filed on Nov. 30, 2017, designating the United States of America, which claims priority to Chinese Patent Application No. 201621362969.4, filed on Dec. 12, 2016, Chinese Patent Application No. 201621362967.5, filed on Dec. 12, 2016, Chinese Patent Application No. 201621397930.6, filed on Dec. 19, 2016, Chinese Patent Application No. 201611179039.X, filed on Dec. 19, 2016, Chinese Patent Application No. 201621463059.5, filed on Dec. 28, 2016, Chinese Patent Application No. 201621461623.X, filed on Dec. 28, 2016, Chinese Patent Application No. 201611248372.1, filed on Dec. 29, 2016, Chinese Patent Application No. 201611248360.9, filed on Dec. 29, 2016, Chinese Patent Application No. 201621491579.7, filed on Dec. 29, 2016, Chinese Patent Application No. 201611249749.5, filed on Dec. 29, 2016, Chinese Patent Application No. 201710356189.1, filed on May 19, 2017, and Chinese Patent Application No. 201720567596.2, filed on May 19, 2017. Each of the above-referenced applications is incorporated herein by reference in their entireties.

TECHNICAL FIELD

The present disclosure generally relates to systems and methods for the field of transportation, and in particular, to systems and methods for determining abnormal information associated with a vehicle.

BACKGROUND

With the development of Internet technology, vehicle (e.g., bicycles) sharing or rental has become more and more popular. A system providing such services may launch a plurality of vehicles (e.g., bicycles) at a plurality of locations within a region (e.g., a city). Due to wear and tear, there may be abnormal information associated with the plurality of vehicles. Therefore, it is important for the system to monitor the abnormal information in real time and notify maintenance workers to process the abnormal information.

SUMMARY

One aspect of the present disclosure is directed to a system for determining abnormal information associated with a bicycle. The system may include a storage device storing a set of instructions and a processor in communication with the storage device. When the processor executes the set of instructions, the processor may be configured to cause the system to perform the following operations. The system may obtain real-time information associated with a bicycle. The system may obtain reference information associated with the bicycle. The system may determine abnormal information associated with the bicycle based on the real-time information and the reference information. The system may transmit the abnormal information to a server or a terminal device associated with according to a Narrow Band Internet of Things (NB-IoT) technique or a Long Range (LoRa) technique.

In some embodiments, the real-time information may include a first voltage that is associated with a wheel of the bicycle, noise information associated with the bicycle, a second voltage that is associated with a solar panel installed on the bicycle, and/or a real-time level signal associated with a connection between the solar panel and a lock of the bicycle.

In some embodiments, the reference information may include a reference voltage that is associated with the wheel of the bicycle, a relationship between noise frequency ranges and fault types associated with the bicycle, a voltage range that is associated with the solar panel, and/or a reference level signal that is associated with the connection between the solar panel and the lock of the bicycle.

In some embodiments, the system may determine whether a difference between the first voltage and the reference voltage is equal to or larger than a threshold voltage. According to a result of the determination that the difference between the first voltage and the reference voltage is equal to or larger than the threshold voltage, the system may determine the deformation information associated with the wheel of the bicycle based on the difference between the first voltage and the reference voltage.

In some embodiments, the system may determine an acquisition time of the second voltage. The system may determine whether the acquisition time is within a predetermined time range. The system may determine whether the second voltage is within the voltage range based on a result of the determination that the acquisition time is within the predetermined time range. The system may determine the fault information associated with the solar panel based on a result of the determination that the second voltage is within the voltage range.

In some embodiments, the system may determine whether the real-time level signal differs from the reference level signal. The system may determine the fault information associated with the connection between the solar panel and the lock of the bicycle based on a result of the determination that the real-time level signal differs from the reference level signal.

In some embodiments, the system may determine a noise frequency based on the noise information. The system may determine the fault type associated with the bicycle based on the noise frequency and the relationship between frequency ranges and fault types.

In some embodiments, the system may output the abnormal information via a voice broadcast, a visual display, and/or an indicator.

One aspect of the present disclosure is directed to a method for determining abnormal information associated with a bicycle. The method may be implemented on a computing device having a processor, a storage medium, and a communication platform connected to a network. The method may include obtaining real-time information associated with a bicycle; obtaining reference information associated with the bicycle; determining, based on the real-time information and the reference information, abnormal information associated with the bicycle; and transmitting the abnormal information to a server or a terminal device associated with according to a Narrow Band Internet of Things (NB-IoT) technique or a Long Range (LoRa) technique.

In some embodiments, the method may further include determining whether a difference between the first voltage and the reference voltage is equal to or larger than a threshold voltage; and determining, based on a result of the determination that the difference between the first voltage and the reference voltage is equal to or larger than the threshold voltage, the deformation information associated with the wheel of the bicycle based on the difference between the first voltage and the reference voltage.

In some embodiments, the method may further include determining an acquisition time of the second voltage; determining whether the acquisition time is within a predetermined time range; determining, based on a result of the determination that the acquisition time is within the predetermined time range, whether the second voltage is within the voltage range; and determining, based on a result of the determination that the second voltage is within the voltage range, the fault information associated with the solar panel.

In some embodiments, the method may further include determining whether the real-time level signal differs from the reference level signal; and determining, based on a result of the determination that the real-time level signal differs from the reference level signal, the fault information associated with the connection between the solar panel and the lock of the bicycle.

In some embodiments, the method may further include determining, based on the noise information, a noise frequency; and determining, based on the noise frequency and the relationship between frequency ranges and fault types, the fault type associated with the bicycle.

In some embodiments, the method may further include outputting the abnormal information via a voice broadcast, a visual display, and/or an indicator.

Yet another aspect of the present disclosure is directed to a non-transitory computer readable medium embodying a computer program product. The computer program product may include instructions configured to cause a computing device to effectuate a method. The method may include obtaining real-time information associated with a bicycle; obtaining reference information associated with the bicycle; determining, based on the real-time information and the reference information, abnormal information associated with the bicycle; and transmitting the abnormal information to a server or a terminal device associated with according to a Narrow Band Internet of Things (NB-IoT) technique or a Long Range (LoRa) technique.

One aspect of the present disclosure is directed to a system for determining abnormal information associated with a bicycle. The system may include a storage device storing a set of instructions and a processor in communication with the storage device. When the processor executes the set of instructions, the processor may be configured to cause the system to perform the following operations. The system may obtain real-time information associated with a bicycle. The system may obtain reference information associated with the bicycle. The system may determine, based on the real-time information and the reference information, abnormal information associated with the bicycle. The system may transmit the abnormal information to the bicycle or a terminal device according to a Narrow Band Internet of Things (NB-IoT) technique or a Long Range (LoRa) technique.

In some embodiments, the real-time information may include a first voltage that is associated with a wheel of the bicycle, noise information associated with the bicycle, a second voltage that is associated with a solar panel installed on the bicycle, and/or a real-time level signal associated with a connection between the solar panel and a lock of the bicycle.

In some embodiments, the reference information may include a reference voltage that is associated with the wheel of the bicycle, a relationship between noise frequency ranges and fault types associated with the bicycle, a voltage range that is associated with the solar panel, and/or a reference level signal that is associated with the connection between the solar panel and the lock of the bicycle.

In some embodiments, the system may determine whether a difference between the first voltage and the reference voltage is equal to or larger than a threshold voltage. According to a result of the determination that the difference between the first voltage and the reference voltage is equal to or larger than the threshold voltage, the system may determine the deformation information associated with the wheel of the bicycle based on the difference between the first voltage and the reference voltage.

In some embodiments, the system may determine an acquisition time of the second voltage. The system may determine whether the acquisition time is within a predetermined time range. The system may determine whether the second voltage is within the voltage range based on a result of the determination that the acquisition time is within the predetermined time range. The system may determine the fault information associated with the solar panel based on a result of the determination that the second voltage is within the voltage range.

In some embodiments, the system may determine whether the real-time level signal differs from the reference level signal. The system may determine the fault information associated with the connection between the solar panel and the lock of the bicycle based on a result of the determination that the real-time level signal differs from the reference level signal.

In some embodiments, the system may determine a noise frequency based on the noise information. The system may determine the fault type associated with the bicycle based on the noise frequency and the relationship between frequency ranges and fault types.

In some embodiments, the system may output the abnormal information via a voice broadcast, a visual display, and/or an indicator.

One aspect of the present disclosure is directed to a method for determining abnormal information associated with a bicycle. The method may be implemented on a computing device having a processor, a storage medium, and a communication platform connected to a network. The method may include obtaining real-time information associated with a bicycle; obtaining reference information associated with the bicycle; determining, based on the real-time information and the reference information, abnormal information associated with the bicycle; and transmitting the abnormal information to the bicycle or a terminal device according to a Narrow Band Internet of Things (NB-IoT) technique or a Long Range (LoRa) technique.

In some embodiments, the method may further include determining whether a difference between the first voltage and the reference voltage is equal to or larger than a threshold voltage; and determining, based on a result of the determination that the difference between the first voltage and the reference voltage is equal to or larger than the threshold voltage, the deformation information associated with the wheel of the bicycle based on the difference between the first voltage and the reference voltage.

In some embodiments, the method may further include determining an acquisition time of the second voltage; determining whether the acquisition time is within a predetermined time range; determining, based on a result of the determination that the acquisition time is within the predetermined time range, whether the second voltage is within the voltage range; and determining, based on a result of the determination that the second voltage is within the voltage range, the fault information associated with the solar panel.

In some embodiments, the method may further include determining whether the real-time level signal differs from the reference level signal; and determining, based on a result of the determination that the real-time level signal differs from the reference level signal, the fault information associated with the connection between the solar panel and the lock of the bicycle.

In some embodiments, the method may further include determining, based on the noise information, a noise frequency; and determining, based on the noise frequency and the relationship between frequency ranges and fault types, the fault type associated with the bicycle.

In some embodiments, the method may further include outputting the abnormal information via a voice broadcast, a visual display, and/or an indicator.

Yet another aspect of the present disclosure is directed to a non-transitory computer readable medium embodying a computer program product. The computer program product may include instructions configured to cause a computing device to effectuate a method. The method may include obtaining real-time information associated with a bicycle; obtaining reference information associated with the bicycle; determining, based on the real-time information and the reference information, abnormal information associated with the bicycle; and transmitting the abnormal information to the bicycle or a terminal device according to a Narrow Band Internet of Things (NB-IoT) technique or a Long Range (LoRa) technique.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 8-A through 8-C are schematic diagrams illustrating exemplary voltage-time curves according to some embodiments of the present disclosure;

FIG. 10-A is flowchart illustrating an exemplary process for determining fault information associated with a solar panel according to some embodiments of the present disclosure;

FIG. 10-B is a flowchart illustrating an exemplary process for determining fault information associated with a connection between a solar panel and a lock of a bicycle according to some embodiments of the present disclosure;

FIGS. 12-A through 12-E are schematic diagrams illustrating an exemplary solar generator according to some embodiments of the present disclosure;

FIGS. 13-A and 13-B are schematic diagrams illustrating exemplary solar panels according to some embodiments of the present disclosure;

FIGS. 14-A through 14-D are schematic diagrams illustrating an exemplary induction generator according to some embodiments of the present disclosure;

FIGS. 15-A through 15-C are schematic diagrams illustrating an exemplary structure of a lock according to some embodiments of the present disclosure.

DETAILED DESCRIPTION

Figure 1:
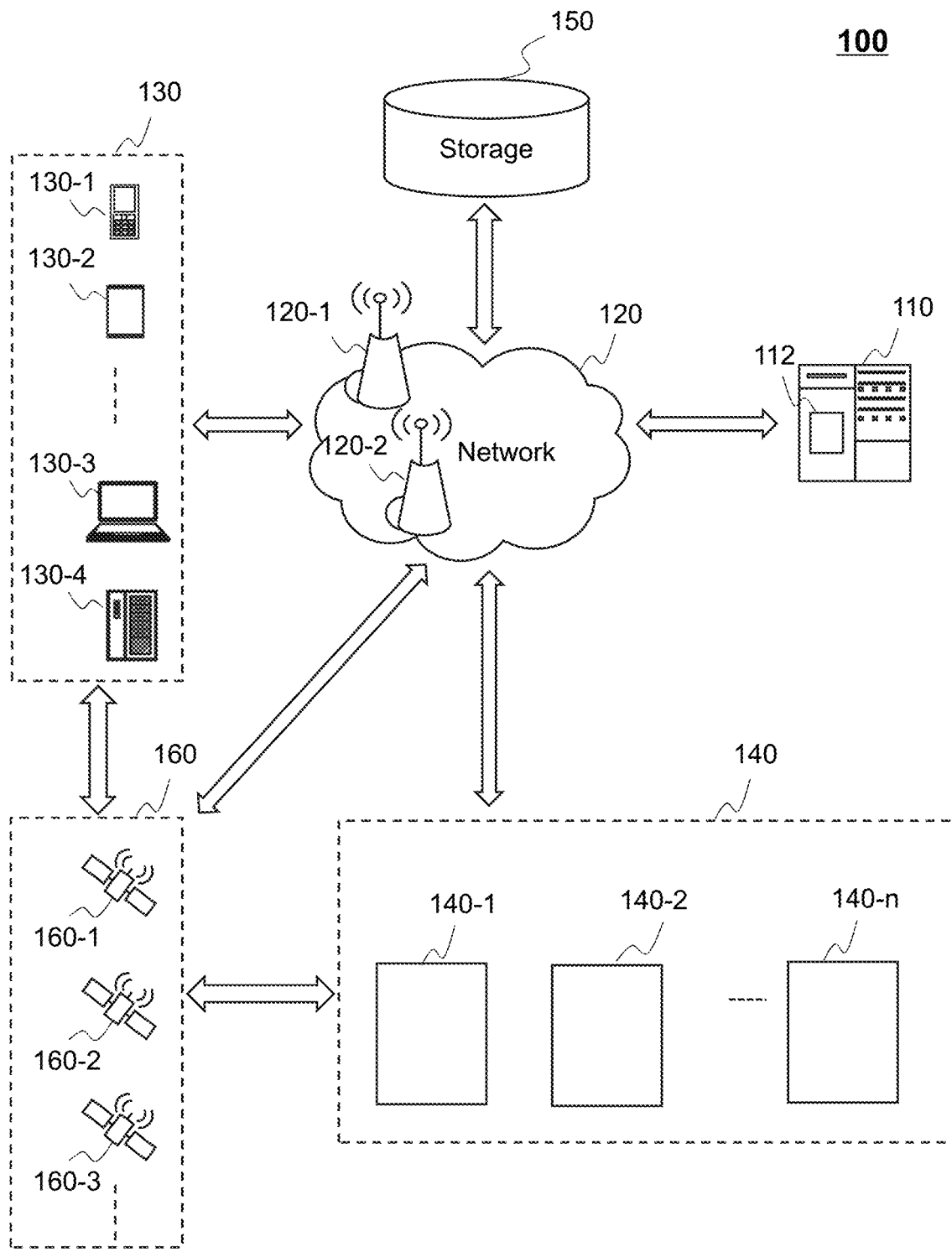
FIG. 1 is a schematic diagram illustrating an exemplary bicycle sharing system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is to describe particular exemplary embodiments only and is not intended to be limiting. As used herein, the singular forms "a," "an," and "the" may be intended to include the plural forms as well, unless the context expressly indicates otherwise. It will be further understood that the terms "comprise," "comprises," and/or "comprising," "include," "includes," and/or "including," when used in the present disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of the present disclosure. It is to be expressly understood, however, that the drawings are for the purpose of illustration and description only and are not intended to limit the scope of the present disclosure. It is understood that the drawings are not to scale.

It will be understood that the term "system," "engine," "unit," and/or "module" used herein are one method to distinguish different components, elements, parts, sections, or assemblies of different levels in ascending order. However, the terms may be displaced by other expressions if they achieve the same purpose.

It will be understood that when a unit, engine, or module is referred to as being "on," "connected to," or "coupled to," another unit, engine, or module, it may be directly on, connected or coupled to, or communicate with the other unit, engine, or module, or an intervening unit, engine, or module may be present, unless the context clearly indicates otherwise. As used herein, the term "and/or" includes any and all combinations of one or more of the associated listed items.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the systems and methods described in the present disclosure are described primarily regarding a bicycle sharing service, it should also be understood that they are merely exemplary embodiments. The systems or methods described in the present disclosure may apply to any other kind of economic sharing service that transfers a usufruct from one to another in an online rental transaction. For example, the systems or methods of the present disclosure may apply to physical asset renting and/or a labor service. The physical asset may include real estate (e.g., a hotel, a room, or an apartment), vehicles (e.g., a car, a bicycle, an electric bicycle, a bus, a hot-air balloon, or an airplane), goods (e.g., clothes, an umbrella, a charger, or a microphone), etc. The labor service may include pet adoption, housekeeping, designated driving, etc. The application of the systems or methods of the present disclosure may include a web page, a plug-in for a browser, a client terminal, a custom system, an internal analysis system, an artificial intelligence robot, or the like, or any combination thereof.

The terms "cyclist," "requestor," "service requestor," "cyclist terminal," "requestor terminal," and "user" in the present disclosure are used interchangeably to refer to an individual, an entity, or a tool that may request or order a bicycle sharing service.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

It should be noted that the bicycle sharing service is a new form of service rooted only in post-Internet era. It provides technical solutions to users and service providers that could raise only in the post-Internet era. In the pre-Internet era, when a user needs to rent a bicycle in a bicycle rental shop, the bicycle request and acceptance occur only between the user and a shopkeeper of the bicycle rental shop who meet each other at a physical place. Through the Internet (and/or other types of network technology like Bluetooth), the bicycle sharing service, however, allows a user of the service to acquire a location of a bicycle accurately and rent a bicycle anywhere and anytime. It also allows the user to park the bicycle in any area where the parking of the bicycle is allowed. Therefore, through the Internet, a bicycle sharing system may provide a more convenient transaction platform for users and service providers that may never meet in the settings of the traditional, pre-Internet bicycle service.

The present disclosure relates to systems and methods for determining abnormal information associated with a bicycle. The abnormal information associated with the bicycle may include deformation information associated with a wheel of the bicycle, fault information associated with a solar panel, fault information associated with a connection between the solar panel and the lock, fault type associated with the bicycle, or the like, or any combination thereof. The systems and methods may determine the abnormal information based on real-time information associated with the bicycle (e.g., a voltage associated with the wheel of the bicycle) and reference information associated with the bicycle (e.g., a reference voltage associated with the wheel of the vehicle 140). For example, in response to the determination that the real-time voltage associated with the wheel is larger than the reference voltage, the systems and methods may determine that the wheel may have been deformed. The systems and methods may further transmit the abnormal information to a server or a terminal device associated with the bicycle via a Narrow Band Internet of Things (NB-IoT) technique or a Long Range (LoRa) technique.

FIG. 1 is a schematic diagram illustrating an exemplary vehicle sharing system 100 according to some embodiments of the present disclosure. The vehicle sharing system 100 may include a server 110, a network 120, one or more terminal devices 130, one or more vehicles 140, a storage 150, and a positioning device 160. The vehicle sharing system 100 may provide a vehicle sharing service allowing a user to use a vehicle 140 (e.g., a bicycle). When the user finishes the usage and wants to return the vehicle, the user may leave the vehicle in an area where the parking of the vehicle is allowed. The vehicle may then be ready for a next user.

The server 110 may communicate with the terminal device 130 and/or the vehicle 140 to provide various functionalities of the bicycle sharing service. For example, the server 110 may receive a service request from the terminal device 130 via, for example, the network 120. The service request may include order information relating to the ride and/or the vehicle 140, including, for example, a vehicle type (e.g., a bicycle type), a departing place, a destination, mileage, a route, or the like, or any combination thereof. The service request may also include the information relating to the user (e.g., the user account information) and/or the terminal device 130 (e.g., the location of the terminal device 130).

The server 110 may also transmit information to the terminal device 130 and/or the vehicle 140. For instance, the server 110 may determine one or more vehicles 140 in response to the service order received from the terminal device 130 and transmit the information relating to the one or more vehicles 140 to the terminal device 130, including, for example, the locations of the one or more vehicles 140, the fees for the ride (e.g., the total fees for the ride, the hourly rate for the ride), or the like, or a combination thereof.

The server 110 may also transmit an instruction to lock a vehicle 140, an instruction to unlock the vehicle 140, the information indicating that the vehicle 140 is out of range, navigation information, etc.

The server 110 may determine a hotspot area based on historical data obtained from the terminal device 130, the vehicle 140, and/or the storage 150. The hotspot area may be an area where vehicles are in high demand. The historical data may include the number of searches for a vehicle in an area. The historical data may also include data relating to historical service orders (e.g., the number of times that the vehicles 140 have been used in an area). The historical data may further include information provided by users via the terminal devices 130 (e.g., advice to place more vehicles in some area submitted by users). The server 110 may also provide a service fee management. The server 110 may determine the cost of a ride based on a monthly membership, a quarterly membership, a season (e.g., spring, summer) membership, an annual membership, or fees per ride.

In some embodiments, the server 110 may be a single server or a server group. The server group may be a centralized server group connected to the network 120 via an access point or a distributed server group connected to the network 120 via one or more access points, respectively. In some embodiments, the server 110 may be locally connected to the network 120 or in remote connection with the network 120. For example, the server 110 may access information and/or data stored in the terminal device 130, the vehicle 140, and/or the storage 150 via the network 120. As another example, the storage 150 may serve as backend data storage of the server 110. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the server 110 may include a processing engine 112. The processing engine 112 may process information and/or data associated with a service request to perform one or more functions in the present disclosure. For example, the processing engine 112 may obtain a service request from the terminal device 130 and transmit an unlocking password to the terminal device 130. In some embodiments, the processing engine 112 may include one or more processing units (e.g., single-core processing engine(s) or multi-core processing engine(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the vehicle sharing system 100 (e.g., the server 110, the terminal device 130, the vehicle 140, or the storage 150) may transmit information and/or data to another component(s) in the vehicle sharing system 100 via the network 120. For example, the server 110 may access and/or obtain data of a plurality of vehicles 140 from the storage 150 via the network 120. For example, the server 110 may transmit the distribution of vehicles 140 near the location of the terminal device 130 to the terminal device 130 via the network 120. In some embodiments, the network 120 may be any wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the vehicle sharing system 100 may be connected to the network 120 to exchange data and/or information.

In some embodiments, a user may be an owner of the terminal device 130. The terminal device 130 may receive input from the user and transmit the information relating to the input to the server 110 via the network 120. The terminal device 130 may also receive information from the server 110 via the network 120. For example, the terminal device 130 may receive input from the user relating to a service request for a bicycle (i.e., a vehicle 140) to the server 110, receive a service confirmation, and/or information or instructions from the server 110. Merely by way of example, the terminal device 130 may be configured to transmit a service request to the server 110 for searching for vehicles 140 near the location of the terminal device 130. The server 110 may determine one or more vehicles 140 (e.g., the locations of the vehicles 140, number of the vehicles 140) near the location of the terminal device 130 according to and in response to the service request. The server 110 may also transmit information relating to the determined one or more vehicles 140 to the terminal device 130 via the network 120. The information of the determined one or more vehicles 140 may be displayed on the terminal device 130 associated with an electronic map. The terminal device 130 may receive input from the user indicating a selected vehicle 140 from the vehicles 140 displayed on the terminal device 130, which may be transmitted to the server 110. The terminal device 130 may also provide a walking navigation for guiding the user to the location of the selected vehicle 140. As another example, the terminal device 130 may receive input from the user for reserving a vehicle 140 and transmit the information to the server 110. As yet another example, the terminal device 130 may transmit feedback information provided by the user to the server 110. The feedback information may include the status of the vehicle 140 (e.g., whether any part of the vehicle 140 needs to be repaired), improvement suggestions, etc.

In some embodiments, the terminal device 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, smart glass, a smart helmet, a smartwatch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a Hololens™, a Gear VR™, etc. In some embodiments, a built-in device in the vehicle 130-4 may include a built-in computer, a built-in onboard television, a built-in tablet, etc. In some embodiments, the terminal device 130 may include a signal transmitter and a signal receiver configured to communicate with the positioning device 160 for locating the position of the user and/or the terminal device 130.

The vehicle 140 may include a plurality of vehicles 140-1, 140-2, . . . , 140-n. The vehicle 140 may be any type of bicycle including, for example, a unicycle, a bicycle, a tricycle, a tandem, a motor bicycle, an electric bicycle, a moped, etc. In the present application, the vehicle 140 may be described in the form of bicycle as examples for illustration purposes, and it should not be interpreted to limit the vehicle 140 to the form of bicycle only. The color of a vehicle 140 is not limiting. Merely by way of example, the color of the body of the vehicle 140 may be yellow. In some embodiments, a vehicle 140 may be identified with a unique symbol. The unique symbol may include a barcode, a quick response (QR) code, a serial number including letters and/or digits, or the like, or any combination thereof. For example, the identification (ID) of the vehicle 140 may be obtained by scanning the QR code of the vehicle 140 through a mobile application of the terminal device 130. The vehicle 140 may communicate with the server 110, the network 120, the terminal device 130, and/or the positioning device 160. For example, the vehicle 140 may transmit status information of the vehicle 140 to the server 110 via the network 120. The status information may include a location of the vehicle 140, a locked/unlocked status of the vehicle 140, a riding distance, a riding duration time, and/or a riding speed of the vehicle 140, battery power of the vehicle 140, or the like, or a combination thereof. The server 110 may monitor the vehicle 140 based on the status information. As another example, the vehicle 140 may receive an instruction (e.g., an instruction to lock/unlock the vehicle 140) from the terminal device 130 and/or the server 110. As yet another example, the vehicle 140 may include a signal transmitter and a signal receiver (e.g., a GPS component of the vehicle 140) configured to communicate with the positioning device 160 for locating a position of the vehicle 140.

The storage 150 may store data and/or instructions. The data may include data related to users, terminal devices 130, vehicles 140 vehicles 140, etc. The data related to the users may include user profiles including for example, names of the users, mobile numbers of the users, ID numbers of the users, types of the users (e.g., annual card users, quarterly card users, or monthly card users), usage records of the users (e.g., riding time, cost), credit rating of the users, historical routes, account balance, etc. The data related to the vehicles 140 vehicles 140 may include service conditions of the bicycles (an inactive state, a booking state, on a ride, in a maintenance state, in a loss state), positions of the bicycles, types of the bicycles (e.g., a unicycle, a bicycle, a tricycle, a tandem, a motor bicycle, an electric bicycle), etc. In some embodiments, the storage 150 may store data obtained from the terminal device 130 and/or the vehicle 140. For example, the storage 150 may store log information associated with the terminal device 130. In some embodiments, the storage 150 may store data and/or instructions that the server 110 may execute or use to perform exemplary methods described in the present disclosure.

In some embodiments, the storage 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The positioning device 160 may determine information associated with an object, for example, one or more of the terminal device 130, or the vehicle 140. For example, the positioning device 160 may determine a current time and a current location of the terminal device 130 and/or the vehicle 140. In some embodiments, the positioning device 160 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, and/or a current time. The location may be in the form of coordinates, such as a latitude coordinate and a longitude coordinate, etc. The positioning device 160 may include one or more satellites, for example, a satellite 160-1, a satellite 160-2, and a satellite 160-3. The satellite 160-1 through 160-3 may determine the information mentioned above independently or jointly. The positioning device 160 may transmit the information mentioned above to the terminal device 130, or the vehicle 140 via the network 120.

In some embodiments, one or more components of the vehicle sharing system 100 may access the data and/or instructions stored in the storage 150 via the network 120. In some embodiments, the storage 150 may be directly connected to the server 110 as a backend storage. In some embodiments, one or more components of the vehicle sharing system 100 (e.g., the server 110, the terminal device 130, or the vehicle 140) may have permissions to access the storage 150. In some embodiments, one or more components of the vehicle sharing system 100 may read and/or modify the information related to the user, and/or the vehicle 140 when one or more conditions are met. For example, the server 110 may read and/or modify one or more users' information after a ride of the vehicle 140 is completed.

In some embodiments, the information exchange between one or more components of the vehicle sharing system 100 may be initiated by way of launching the mobile application of the bicycle sharing service on a terminal device 130, requesting a bicycle service, or inputting a query via the terminal device 130 (e.g., searching for a bicycle). The object of the service request may be any product. In some embodiments, the product may include food, medicine, commodity, chemical product, electrical appliance, clothing, car, housing, luxury, or the like, or any combination thereof. In some other embodiments, the product may include a service product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistant (PDA), a smartwatch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application related to transporting may include a traveling software and/or application, a vehicle scheduling software and/or application, a mapping software and/or application, etc.

One of ordinary skill in the art would understand that when an element of the vehicle sharing system 100 performs, the element may perform through electrical signals and/or electromagnetic signals. For example, when a terminal device 130 processes a task, such as making a determination, unlocking a vehicle 140, the terminal device 130 may operate logic circuits in its processor to process such task. When the terminal device 130 transmits out a query (e.g., information relating to a location of a vehicle 140) to the server 110, a processor of the terminal device 130 may generate electrical signals encoding the query. The processor of the terminal device 130 may then transmit the electrical signals to an output port. If the terminal device 130 communicates with the server 110 via a wired network, the output port may be physically connected to a cable, which further transmits the electrical signal to an input port of the server 110. If the terminal device 130 communicates with the server 110 via a wireless network, the output port of the terminal device 130 may be one or more antennas, which convert the electrical signals to electromagnetic signals. Similarly, a vehicle 140 may process a task through operation of logic circuits in its processor, and receive an instruction and/or service order from the server 110 via electrical signals or electromagnet signals. Within an electronic device, such as the terminal device 130, the vehicle 140, and/or the server 110, when a processor thereof processes an instruction, transmits out an instruction, and/or performs an action, the instruction and/or action is conducted via electrical signals. For example, when the processor retrieves data (e.g., a plurality of user profiles) from a storage medium (e.g., the storage 150), it may transmit out electrical signals to a reading device of the storage medium, which may read structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
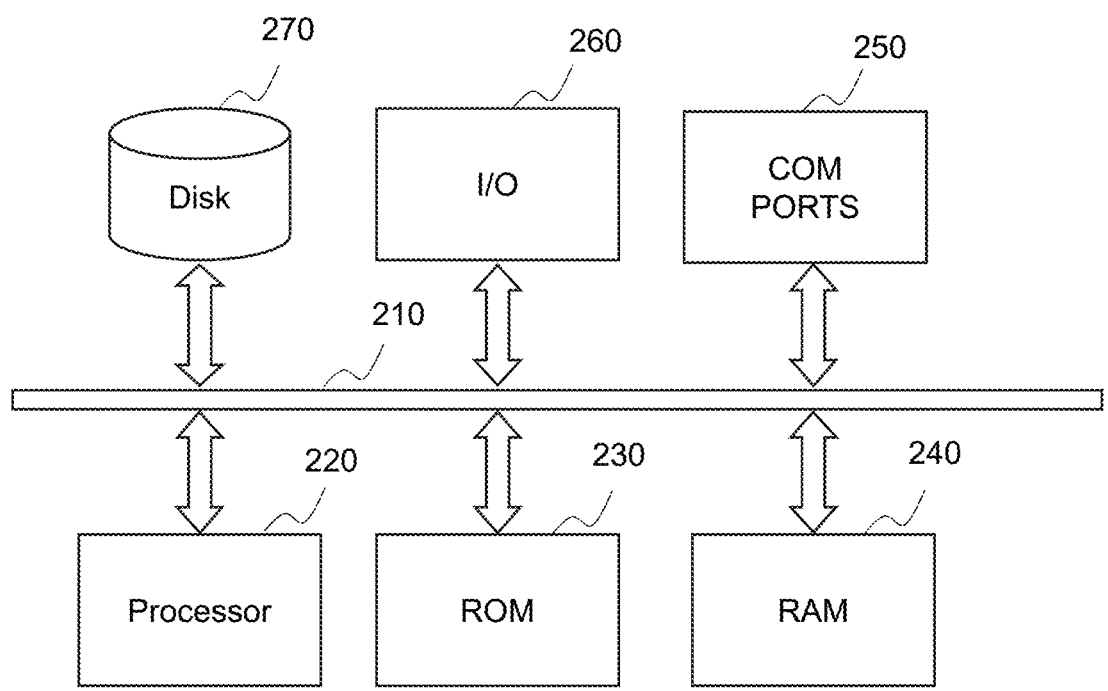
FIG. 2 is a schematic diagram illustrating hardware and/or software components of an exemplary computing device according to some embodiments of the present disclosure.

FIG. 2 is a schematic diagram illustrating exemplary hardware and/or software components of a computing device 200 according to some embodiments of the present disclosure. The computing device 200 may be used to implement any component of the vehicle sharing system 100 as described herein. For example, the processing engine 112 of the server 110, and/or the terminal device 130 may be implemented on the computing device 200, via its hardware, software program, firmware, or a combination thereof. Although only one such computer is shown for convenience, the computer functions related to the bicycle sharing service as described herein may be implemented in a distributed manner on a number of similar platforms to distribute the processing load.

The computing device 200, for example, may include COM ports 250 connected to and from a network (e.g., the network 120) connected thereto to facilitate data communications. The computing device 200 may also include a processor 220 for executing program instructions to perform the functions of the server 110 described herein. The exemplary computer platform may include an internal communication bus 210, program storage and data storage of different forms, for example, a disk 270, and a read-only memory (ROM) 230, or a random access memory (RAM) 240, for various data files to be processed and/or transmitted by the computer. The exemplary computer platform may also include program instructions stored in the ROM 230, the RAM 240, and/or another type of non-transitory storage medium to be executed by the processor 220. The methods and/or processes of the present disclosure may be implemented as the program instructions. The computing device 200 also includes an I/O 260, supporting input/output between the computer, the user, and other components therein. The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, the CPU and/or processor of the computing device 200 may execute both step A and step B. As in another example, step A and step B may also be performed by two different CPUs and/or processors jointly or separately in the computing device 200 (e.g., the first processor executes step A and the second processor executes step B, or the first and second processors jointly execute steps A and B).

Figure 3:
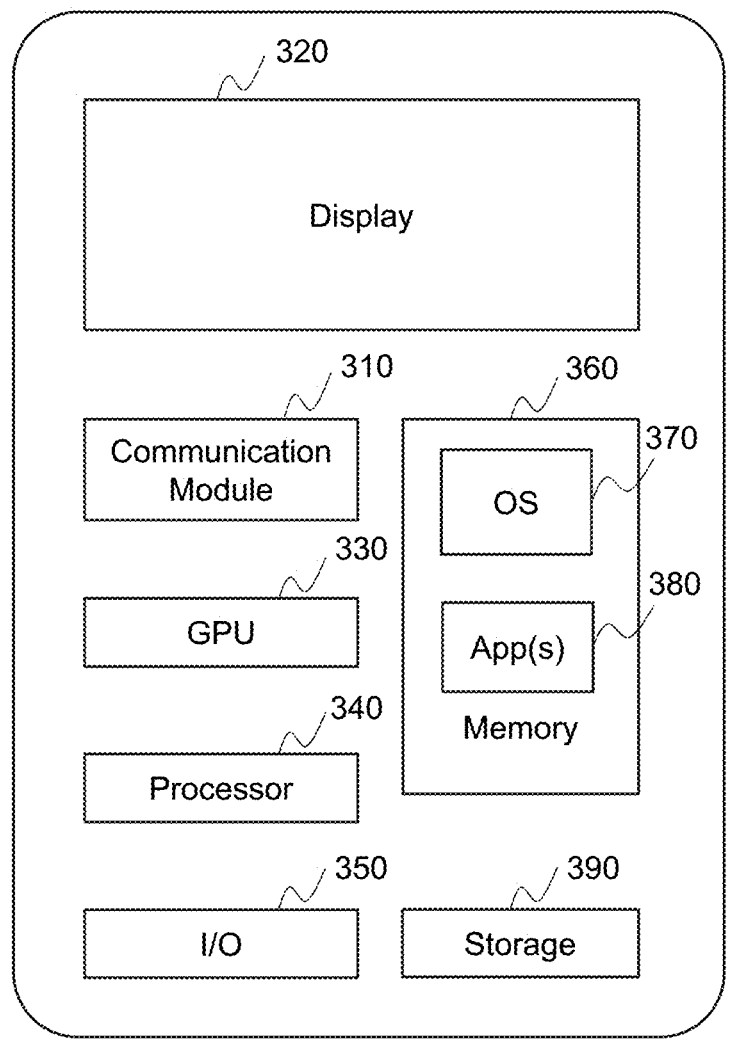
FIG. 3 is a schematic diagram illustrating hardware and/or software components of an exemplary mobile device according to some embodiments of the present disclosure.

FIG. 3 is a schematic diagram illustrating exemplary hardware and/or software components of a mobile device 300 according to some embodiments of the present disclosure. As illustrated in FIG. 3, the mobile device 300 may include a communication module 310, a display 320, a graphics processing unit (GPU) 330, a processor 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the processor 340. The applications 380 may include a browser or any other suitable apps for transmitting, receiving and presenting information relating to the status of the vehicle 140 (e.g., the location of the vehicle 140) from the server 110. User interactions with the information stream may be achieved via the I/O 350 and provided to the server 110 and/or other components of the vehicle sharing system 100 via the network 120.

Figure 4:
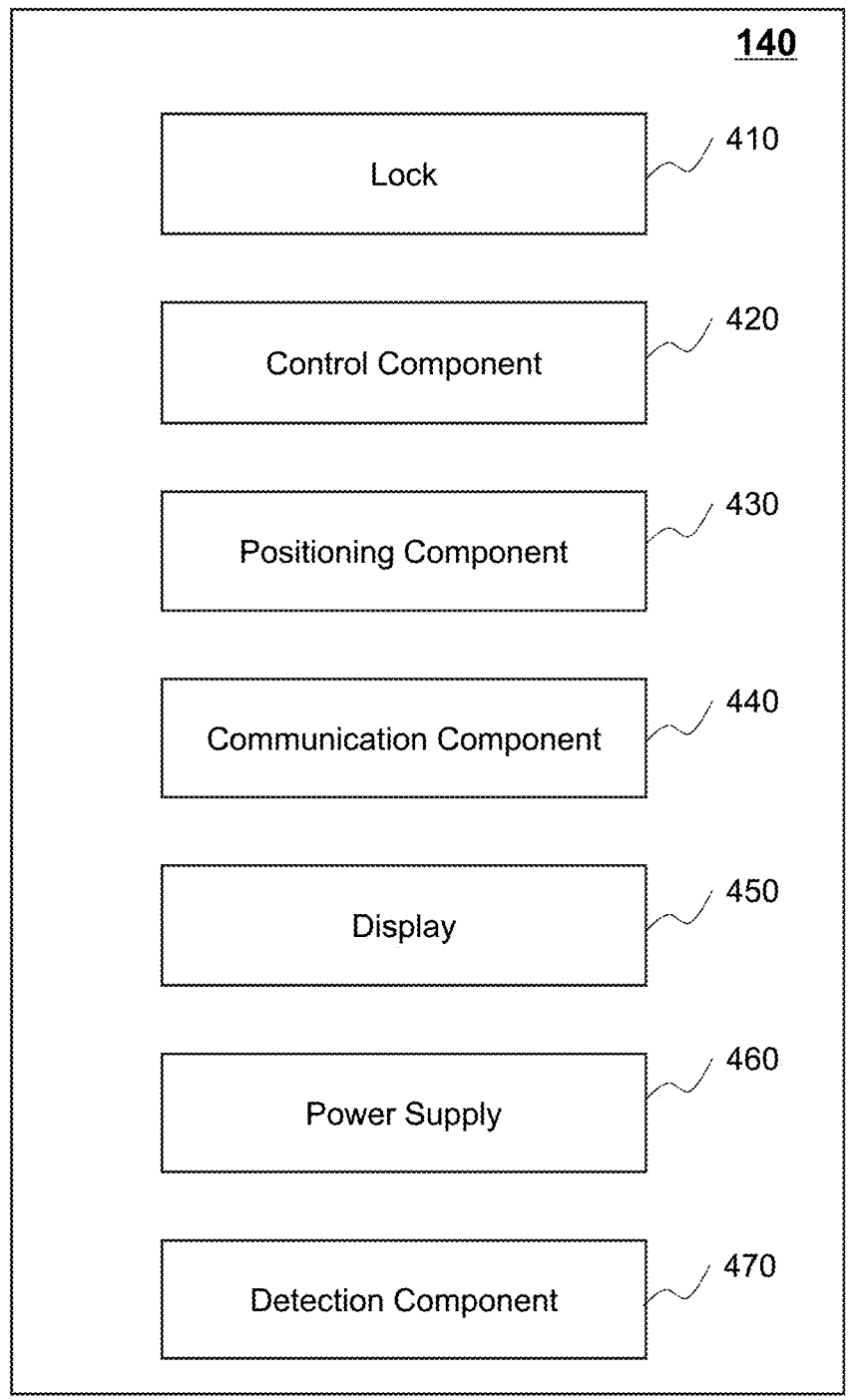
FIG. 4 is a block diagram illustrating hardware and/or software components of an exemplary bicycle according to some embodiments of the present disclosure.

FIG. 4 is a schematic diagram illustrating exemplary hardware and/or software components of a vehicle 140 according to some embodiments of the present disclosure. The vehicle 140 may include a lock 410, a control component 420, a positioning component 430, a communication component 440, a display 450, a power supply 460, and a detection component 470. In the present application, the vehicle 140 may be described in the form of bicycle as examples for illustration purposes, but it should not be interpreted to limit the vehicle 140 to the form of bicycle only.

The lock 410 may be configured to lock one or more wheels of the bicycle. In some embodiments, the lock 410 may be configured to secure the vehicle 140 to a fixed object such as a bicycle lock pillar or a rack. The lock 410 may include any combination of mechanisms to implement the function thereof. For example, the lock 410 may include a mechanical lock or an electronic lock.

The control component 420 may control operations of other components of the vehicle 140 (e.g., the lock 410, the positioning component 430, and/or the communication component 440). For example, the control component 420 may control the lock 410 to be opened (i.e., releasing the bicycle) and/or locked (i.e., locking the bicycle) in response to instructions from the server 110 and/or the terminal device 130.

The positioning component 430 may communicate with the positioning device 160 of the vehicle sharing system 100 for locating or tracking a position of the vehicle 140. The positioning component 430 may determine longitude information and/or latitude information associated with the vehicle 140. The longitude information and/or the latitude information may be used for assisting maintenance workers to identify the vehicle 140.

The communication component 440 may facilitate communications among the vehicle 140, the terminal device 130, and/or the server 110. The communication component 440 may utilize various wireless technologies such as a cellular communication technology (e.g., GSM, CDMA, 2G, 3G, 4G), a short-range radio communication technology (e.g., Bluetooth, NFC, radio frequency identification (RFID), Zig-bee), narrow band internet of things (NB-IoT), lower-power wide-area network (LPWAN) (e.g., LoRa), etc. In some embodiments, the communication component 440 may include a communication indicator (e.g., a LED light, not shown) installed on, for example, a handlebar of the vehicle 140. In some embodiments, the communication indicator may light up indicating that the vehicle 140 is in communication with the server 110 or the terminal device 130.

In some embodiments, the control component 420, the positioning component 430, and/or the communication component 440 may be integrated into the lock 410.

The display 450 may display information relating to the vehicle 140 when a user is riding the vehicle 140. The information may include a navigation map, a riding speed, a riding distance, etc. In some embodiments, the display 450 may also display advertisements, news, traffic, weather, etc. In some embodiments, the display 450 may provide an interactive interface for the user. For example, the user may select a navigation route from a plurality of routes shown on the display 450. The display 450 may include a liquid crystal display (LCD), a light emitting diode (LED)-based display, a flat panel display or curved screen, a television device, a cathode ray tube (CRT), or the like, or any combination thereof. In some embodiments, the display 450 may be integrated with the lock 410.

The power supply 460 may provide power for operations of components of the vehicle 140 (e.g., the control component 420, the positioning component 430, the communication component 440, the display 450). The power supply 460 may include a battery charged by solar energy, kinetic energy (e.g., during a ride of the vehicle 140, the battery may be charged), wind energy, mechanical energy, etc. In some embodiments, the vehicle 140 may include other components, for example, a moving component (e.g., a pedal, a wheel), a gearing component (e.g., a bicycle chain), an arresting component (e.g., a brake), an alarming component (e.g., a bell), or the like, or any combination thereof.

The detection component 470 may detect abnormal information associated with the vehicle 140. In some embodiments, the detection component 470 may include a voltage detector, a current detector, a temperature sensor, a humidity sensor, a velocity sensor, an acceleration sensor, a microphone, or the like, or any combination thereof. The detection component 470 may determine the abnormal information associated with the vehicle 140 (e.g., deformation information associated with a wheel of the bicycle) and transmit the abnormal information to the server 110 or the terminal device 130. In some embodiments, the vehicle 140 may also include a processor (not shown) configured to perform the functions thereof disclosed in this application. For example, the processor may obtain real-time information and reference information associated with the vehicle 140 and detect abnormal information associated with the vehicle 140 based on the real-time information and the reference information.

The processor in the vehicle 140 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

Figure 5:
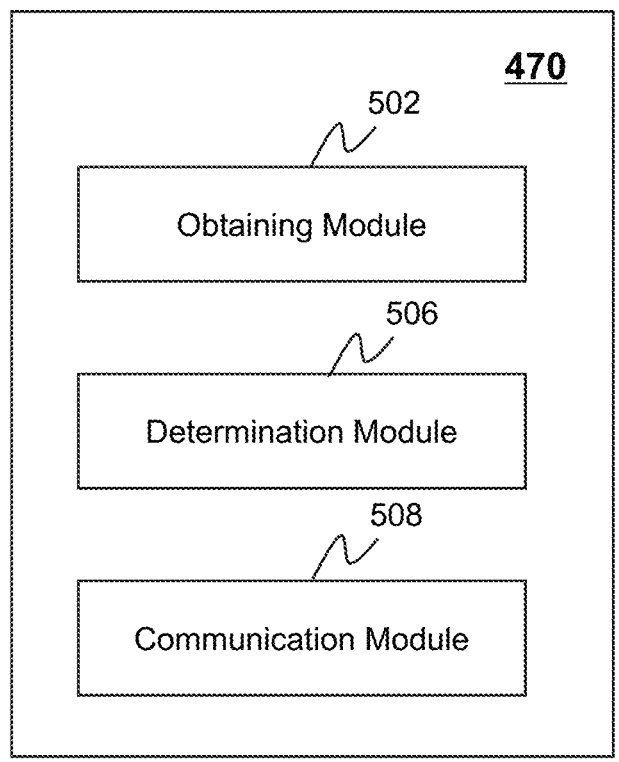
FIG. 5 is block diagram illustrating an exemplary detection component according to some embodiments of the present disclosure.

FIG. 5 is a schematic block diagram illustrating an exemplary detection component 470 according to some embodiments of the present disclosure. The detection component 470 may include an obtaining module 502, a determination module 506, and a communication module 508. Generally, the terms "module," "unit," and/or "engine" used herein, refers to logic embodied in hardware or firmware, or to a collection of software instructions. The modules, units, and engines described herein may be implemented as software and/or hardware modules and may be stored in any type of non-transitory computer-readable medium or other storage device. In some embodiments, a software module may be compiled and linked into an executable program. It will be appreciated that software modules can be callable from other modules or from themselves, and/or can be invoked in response to detected events or interrupts. Software modules configured for execution on the processor of the vehicle 140 can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules can be included of connected logic units, such as gates and flip-flops, and/or can be included of programmable units, such as programmable gate arrays or processors. The modules or computing device functionality described herein are preferably implemented as software modules, but can be represented in hardware or firmware. In general, the modules described herein refer to logical modules that can be combined with other modules or divided into sub-modules despite their physical organization or storage.

The obtaining module 502 may be configured to obtain real-time information associated with the vehicle 140. The real-time information may include a first voltage that is associated with a wheel of the vehicle 140, noise information that is associated with the vehicle 140, a second voltage that is associated with a solar panel installed on the vehicle 140, a real-time level signal that is associated with a connection between the solar panel and the lock 410, etc.

In some embodiments, the obtaining module 502 may obtain the real-time information associated with the vehicle 140 from one or more detection device (not shown) including a voltage detector, a current detector, a temperature sensor, a humidity sensor, a velocity sensor, an acceleration sensor, a microphone, or the like, or any combination thereof.

The obtaining module 502 may be further configured to obtain reference information associated with the vehicle 140. The reference information may include a reference voltage that is associated with the wheel of the vehicle 140, a relationship between frequency ranges and fault types associated with the vehicle 140, a voltage range that is associated with the solar panel, a reference level signal that is associated with the connection between the solar panel and the lock 410, etc.

In some embodiments, the obtaining module 502 may obtain the reference information from a storage device (e.g., the storage 150) disclosed elsewhere in the present disclosure. In some embodiments, the reference information may be default settings of the vehicle sharing system 100 or may be adjustable in different situations.

The determination module 506 may be configured to determine abnormal information associated with the vehicle 140 based on the real-time information and the reference information. The abnormal information may include deformation information that is associated with a wheel of the vehicle 140, a fault type (e.g., a fault associated with a pedal) that is associated with the vehicle 140, first fault information that is associated with a solar panel installed on the vehicle 140, second fault information that is associated with a connection between the solar panel and the lock 410, etc.

The communication module 508 may be configured to transmit the abnormal information and bicycle information (e.g., a bicycle serial number, a current location of the vehicle 140) to the server 110 or the terminal device 130. The communication module 508 may transmit the abnormal information and the bicycle information according to a narrow band internet of things (NB-IoT) technique or a long range (LoRa) technique. In some embodiments, the communication module 508 may include a radiofrequency (RF) chip and an antenna. The RF chip may convert the abnormal information into electromagnetic waves, and the antenna may transmit the electromagnetic wave to the server 110 or the terminal device 130. In some embodiments, the communication module 508 may transmit the abnormal information and the bicycle information to the terminal device 130 according to a short-range radio communication technology (e.g., Bluetooth technique).

In some embodiments, after determining the abnormal information, the vehicle 140 may provide a notification associated with the abnormal information to notify a user who intends to use the vehicle 140. The vehicle 140 may provide the notification via a voice broadcast, a visual display, an indicator, etc.

The modules in the detection component 470 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the determination module 506 and the communication module 508 may be combined into a single module which may both determine the abnormal information and transmit the abnormal information and the bicycle information to the server 110 or the terminal device 130. As another example, the detection component 470 may include a storage module (not shown) used to store information and/or data (e.g., the real-time information, the reference information, the abnormal information) associated with the vehicle 140.

Figure 6:
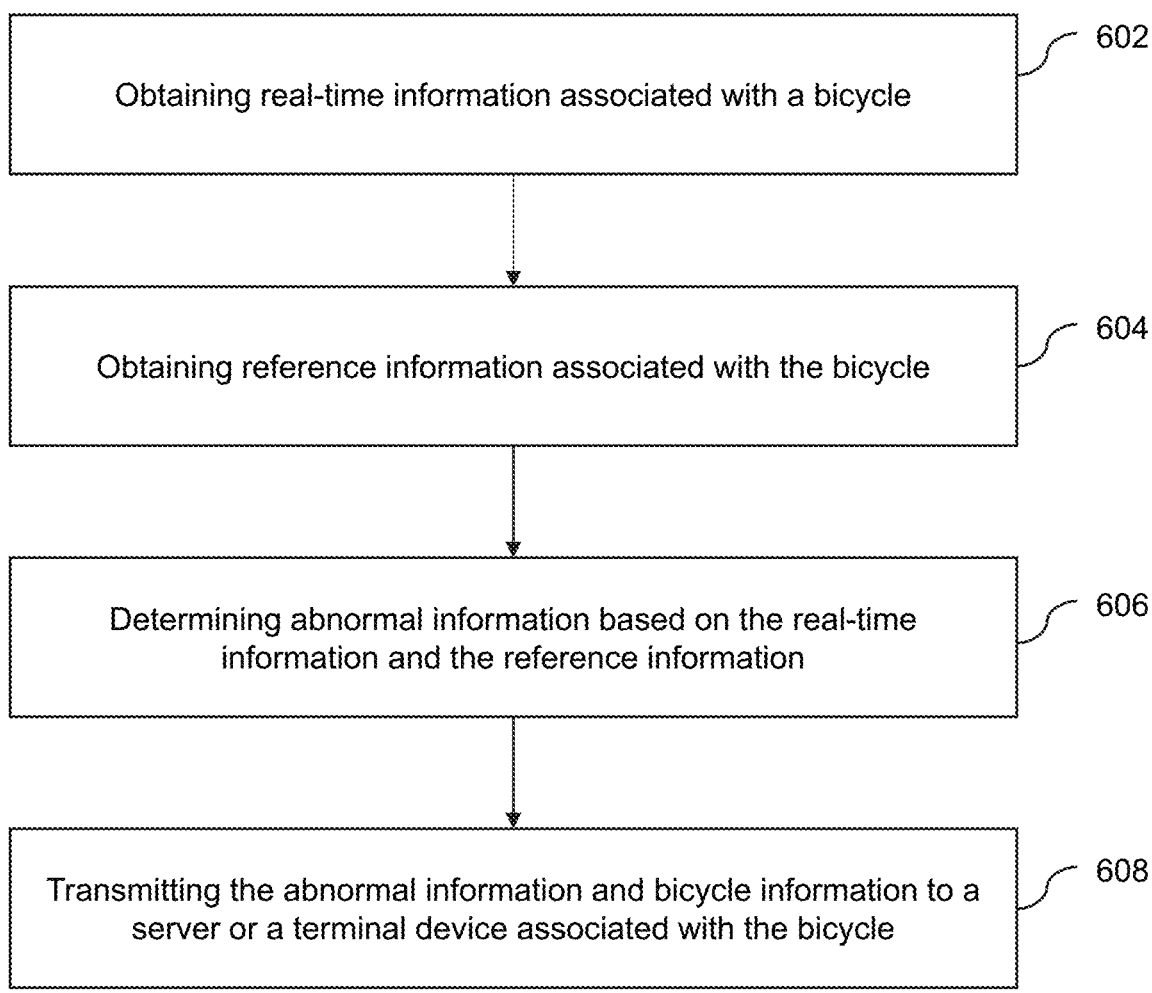
FIG. 6 is a flowchart illustrating an exemplary process for determining abnormal information associated with a bicycle according to some embodiments of the present disclosure.

FIG. 6 is a flowchart illustrating an exemplary process 600 for determining abnormal information associated with a bicycle according to some embodiments of the present disclosure. In some embodiments, the process 600 may be executed by the vehicle sharing system 100. For example, the process 600 may be implemented as a set of instructions (e.g., an application) stored in the ROM 230, the RAM 240, or a storage device of the vehicle 140. The processor 220 and/or the modules in FIG. 5 may execute the set of instructions and, when executing the instructions, the processor 220 and/or the modules may be configured to perform the process 600. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 6 and described below is not intended to be limiting.

In 602, the detection component 470 (e.g., the obtaining module 502) may obtain real-time information associated with the vehicle 140. The real-time information may include a first voltage that is associated with a wheel of the vehicle 140, noise information that is associated with the vehicle 140, a second voltage that is associated with a solar panel installed on the vehicle 140, a real-time level signal that is associated with a connection between the solar panel and the lock 410, etc.

In some embodiments, the detection component 470 may obtain the real-time information associated with the vehicle 140 from one or more detection devices (not shown), which may include a voltage detector, a current detector, a temperature sensor, a humidity sensor, a velocity sensor, an acceleration sensor, a microphone, or a combination thereof. For example, the detection component 470 may obtain the first voltage associated with the wheel of the vehicle 140 from the voltage detector. As another example, the detection component 470 may obtain the noise information associated with the vehicle 140 from the microphone.

In 604, the detection component 470 (e.g., the obtaining module 502) may obtain reference information associated with the vehicle 140. The reference information may include a reference voltage that is associated with the wheel of the vehicle 140, a relationship between noise frequency ranges and fault types associated with the vehicle 140, a voltage range that is associated with the solar panel, a reference level signal that is associated with the connection between the solar panel and the lock 410, or a combination thereof.

In some embodiments, the detection component 470 may obtain the reference information from a storage device (e.g., the storage 150) disclosed elsewhere in the present disclosure. In some embodiments, the reference information may be default settings of the vehicle sharing system 100. Alternatively or additionally, the reference information may be adjustable in different situations.

In 606, the detection component 470 (e.g., the determination module 506) may determine abnormal information associated with the vehicle 140 based on the real-time information and the reference information.

In some embodiments, the abnormal information may include deformation information that is associated with the wheel of the vehicle 140, a fault type (e.g., a fault associated with a pedal) that is associated with the vehicle 140, first fault information that is associated with the solar panel installed on the vehicle 140, second fault information that is associated with the connection between the solar panel and the lock 410, a combination thereof. For example, the determination module 506 may determine the deformation information that is associated with the wheel of the vehicle 140 based on the first voltage and the reference voltage. As another example, the determination module 506 may determine the fault type that is associated with the vehicle 140 based on the noise information and the relationship between noise frequency ranges and fault types. As a further example, the determination module 506 may determine the first fault information that is associated with the solar panel based on the second voltage and the voltage range. As a still further example, the determination module 506 may determine the second fault information that is associated with the connection between the solar panel and the lock 410 based on the real-time level signal and the reference level signal.

In 608, the detection component 470 (e.g., the communication module 508) may transmit the abnormal information and bicycle information (e.g., a bicycle serial number, a current location of the vehicle 140) to the server 110 or the terminal device 130. The detection component 470 may transmit the abnormal information and the bicycle information according to a narrow band internet of things (NB-IoT) technique or a long-range (LoRa) technique. In some embodiments, the detection component 470 may transmit the abnormal information and the bicycle information to the terminal device 130 according to a short-range radio communication technology (e.g., Bluetooth technique).

In some embodiments, after receiving the abnormal information, the server 110 may transmit the abnormal information and the bicycle information to a terminal device associated with a maintenance worker. Further, the maintenance worker may identify the vehicle 140 based on the bicycle information (e.g., the bicycle serial number, the location of the vehicle 140) and perform a maintenance operation on the vehicle 140. Alternatively or additionally, after receiving the abnormal information, the terminal device 130 may provide a notification to notify a user that there may be a problem with the vehicle 140. For example, the terminal device 130 may present the abnormal information via a user interface on the terminal device 130. As another example, the terminal device 130 may broadcast the abnormal information via a voice broadcast of the terminal device 130.

In some embodiments, after determining the abnormal information, the vehicle 140 may provide a notification to notify a user who intends to use the vehicle 140. The vehicle 140 may provide the notification via a voice broadcast, a visual display, an indicator, etc. For example, the vehicle 140 may provide a voice notification (e.g., "the wheel of the bicycle has been deformed") via the voice broadcast.

It should be noted that the above description is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 600. In the storing step, the detection component 470 may store information and/or data (e.g., the real-time information, the reference information, the abnormal information) associated with the vehicle 140 in a storage device (e.g., the storage 150) disclosed elsewhere in the present disclosure.

Figure 7:
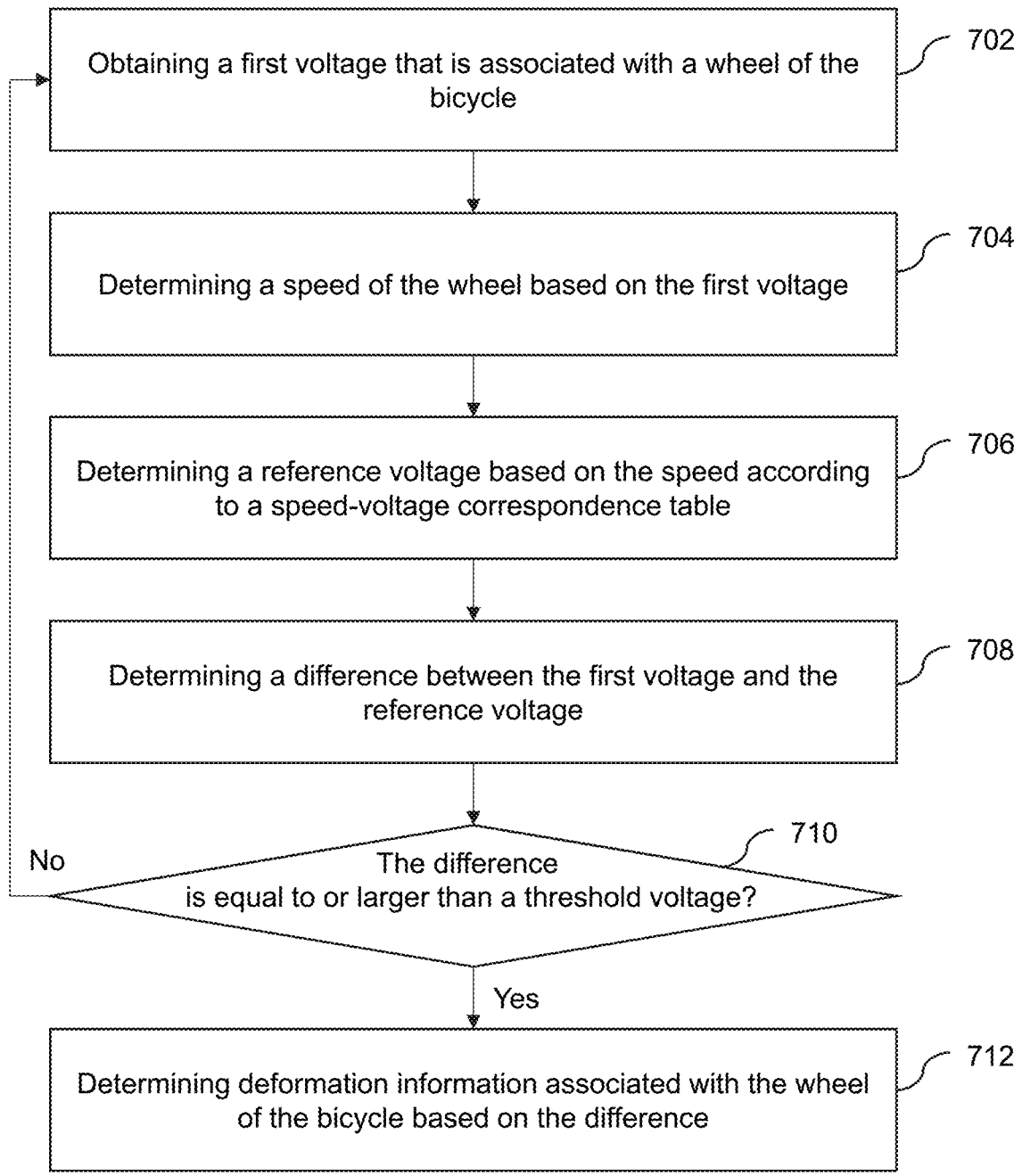
FIG. 7 is a flowchart illustrating an exemplary process for determining deformation information associated with a bicycle according to some embodiments of the present disclosure.

FIG. 7 is a flowchart illustrating an exemplary process 700 for determining deformation information associated with a wheel of a bicycle according to some embodiments of the present disclosure. In some embodiments, the process 700 may be executed by the vehicle sharing system 100. For example, the process 700 may be implemented as a set of instructions (e.g., an application) stored in the ROM 230, the RAM 240, or a storage device of the vehicle 140. The processor 220 and/or the modules in FIG. 5 may execute the set of instructions and, when executing the instructions, the processor 220 and/or the modules may be configured to perform the process 700. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 7 and described below is not intended to be limiting.

In 702, the detection component 470 (e.g., the obtaining module 502) may obtain a first voltage that is associated with a wheel of the vehicle 140. The first voltage may be generated by the power supply 460, for example, an induction generator 1400 (see, e.g., FIGS. 14-A through 14-D and the descriptions thereof) installed on the wheel of the vehicle 140. The first voltage may be generated by the induction generator 1400 during the rotation of the wheel of the vehicle 140.

In 704, the detection component 470 (e.g., the determination module 506) may determine a speed of the wheel based on the first voltage. In some embodiments, the speed of the wheel may be an average speed during a period.

In some embodiments, the detection component 470 may determine the speed of the wheel according to formula (1) below:

$$u = \frac{c}{T} \tag{1}$$

where u refers to the speed of the wheel, c refers to a perimeter of the wheel, and T refers to a period required for the wheel to rotate a circle (also referred to as a "cycle period"). It is known that a diameter of a wheel of a bicycle satisfies a standard (e.g., ISO standard), for example, 20 inches, 24 inches, 26 inches. Therefore, the detection component 470 may determine the diameter of the wheel according to the standard and determine the perimeter of the wheel based on the diameter.

In some embodiments, the detection component 470 may determine the cycle period based on a voltage-time curve illustrated in FIGS. 8-A through 8-C. As illustrated in FIG. 8-A, in an ideal condition, during the rotation of the wheel of the vehicle 140, the induction generator 1400 may generate a relatively stable voltage which is approximately constant with time. As illustrated in FIG. 8-B or FIG. 8-C, in actual condition, during the rotation of the wheel of the vehicle 140, the induction generator 1400 may generate a changeable voltage which may have peaks or valleys. The detection component 470 may determine the cycle period based on the peaks or valleys. For example, if it is assumed that the first voltage is acquired at a time point H, the detection component 470 may determine a time interval between two adjacent valleys (e.g., peak A and peak B illustrated in FIG. 8-B) as the cycle period. As another example, if it is assumed that the first voltage is acquired at a time point L, the detection component 470 may determine a time interval between two adjacent peaks (e.g., peak C and peak D illustrated in FIG. 8-C) as the cycle period. As a further example, the detection component 470 may determine a time interval among a plurality of peaks or valleys and determine an average time interval as the cycle period.

In 706, the detection component 470 (e.g., determination module 506) may determine a reference voltage based on the speed according to a speed-voltage correspondence table. The speed-voltage correspondence table may indicate a relationship between speeds of the vehicle 140 and voltages generated by the power supply 460 (e.g., the induction generator 1400). In some embodiments, the detection component 470 may obtain the speed-voltage correspondence table from a storage device (e.g., the storage 150) disclosed elsewhere in the present disclosure. In some embodiments, the speed-voltage correspondence table may be associated with one or more tests performed on the vehicle 140 or a test bicycle having one or more similar features with the vehicle 140. For example, the detection component 470 may control the test bicycle to move with a plurality of test speeds and determine a plurality of test voltages corresponding to the plurality of test speeds. Further, the detection component 470 may determine the speed-voltage correspondence table based on the plurality of test speeds and the plurality of test voltages. As described above, as illustrated in FIG. 8-B or FIG. 8-C, during the rotation of the wheel of the bicycle, the voltage may change with time. In this situation, the detection component 470 may determine an average voltage during one or more cycle periods as the test voltage.

In 708, the detection component 470 (e.g., determination module 506) may determine a difference between the first voltage and the reference voltage. In some embodiments, the detection component 470 may determine an absolute value of the difference between the first voltage and the reference voltage.

In 710, the detection component 470 (e.g., the determination module 506) may determine whether the difference is equal to or larger than a threshold voltage (e.g., 1 V). The threshold voltage may be default settings of the vehicle sharing system 100. Alternatively or additionally, the threshold voltage may be adjustable in different situations. According to a result of the determination that the difference is less than the threshold voltage, the detection component 470 may execute the process 700 back to step 702 to obtain a next first voltage at a next time point. According to a result of the determination that the difference is equal to or larger than the threshold voltage, the detection component 470 may in 712 determine deformation information associated with the wheel of the vehicle 140 based on the difference. For example, according to a result of the determination that the difference is equal to or larger than the threshold voltage, the detection component 470 may determine that the wheel may have been deformed.

It should be noted that the above description is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. For example, in 708, the detection component 470 may determine a ratio of the first voltage to the reference voltage and further determine the deformation information associated with the wheel based on the ratio.

FIGS. 8-A through 8-C are schematic diagrams illustrating exemplary voltage-time curves according to some embodiments of the present disclosure. As illustrated in FIG. 8-A, in an ideal condition, the power supply 460 may generate a relatively stable voltage which may be approximately constant with time. As illustrated in FIG. 8-B or FIG. 8-C, in an actual condition, the voltage may change with time. For example, the voltage-time curve may have peaks (e.g., point C or point D) or valleys (e.g., point A or point B).

Figure 9:
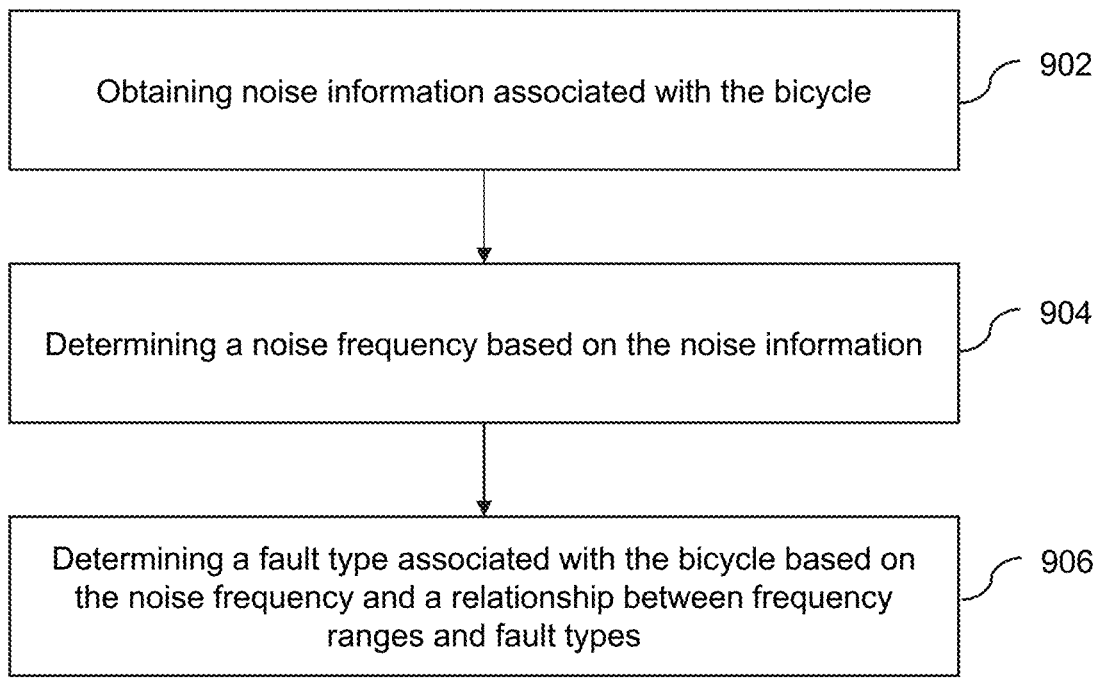
FIG. 9 is a flowchart illustrating an exemplary process for determining a fault type associated with a bicycle according to some embodiments of the present disclosure.

FIG. 9 is a flowchart illustrating an exemplary process 900 for determining a fault type associated with a bicycle according to some embodiments of the present disclosure. In some embodiments, the process 900 may be executed by the vehicle sharing system 100. For example, the process 900 may be implemented as a set of instructions (e.g., an application) stored in the ROM 230, the RAM 240, or a storage device of the vehicle 140. The processor 220 and/or the modules in FIG. 5 may execute the set of instructions and, when executing the instructions, the processor 220 and/or the modules may be configured to perform the process 900. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 9 and described below is not intended to be limiting.

In 902, the detection component 470 (e.g., the obtaining module 502) may obtain noise information associated with the vehicle 140. The noise information may be associated with a component (e.g., a chain, a wheel, a crankset, a wheel disk, a pedal) of the vehicle 140. The noise information may be collected by one or more noise collectors (e.g., a microphone) installed on the vehicle 140. The noise collector(s) may collect the noise information according to a time interval (e.g., per 5 minutes, per 10 minutes). The noise collector(s) may collect noises and convert the noises to electric signals (hereafter referred to as "noise signals").

In some embodiments, the noise information may include environmental noise. In order to reduce the effect of the environmental noise, the detection component 470 may filter the environmental noise via a band-pass filter or the noise collector(s) may be surrounded by an acoustic insulation material. The acoustic insulation material may include a metal plate, a fiberboard, a wooden board, a plasterboard, etc.

In some embodiments, there may be one noise collector installed on the vehicle 140. The noise collector may collect noise signals from one or more components of the vehicle 140. In order to distinguish noise signals collected from different components, the detection component 470 may include a frequency divider (e.g., a band-pass filter) that may be used to divide the noise signals. For example, the frequency divider may divide the noise signals into a first noise signal within a frequency range of A to B and a second noise signal within a frequency range of C to D.

In some embodiments, there may be a plurality of noise collectors installed on a plurality of components of the vehicle 140. Each of the plurality of noise collectors may include an identification (e.g., a microphone serial number) and may correspond to a component of the vehicle 140. In order to distinguish noise signals collected from different components, the detection component 470 may include a multi-channel controller including a plurality of channels, wherein each of the plurality of channels may correspond to a noise signal.

In 904, the detection component 470 (e.g., the determination module 506) may determine a noise frequency based on the noise information. The detection component 470 may perform an analog-digital conversion (ADC) on the noise information (i.e., the noise signal) to determine the noise frequency.

In 906, the detection component 470 (e.g., the determination module 506) may determine a fault type associated with the vehicle 140 based on the noise frequency and a relationship (e.g., Table 1) between noise frequency ranges and fault types. The fault type may include a fault associated with an offset of the chain, a fault associated with a deformation of the wheel, a fault associated with a damage of the crankset, a fault associated with a damage of the wheel disk, a fault associated with a damage of the pedal, etc. The detection component 470 may obtain the relationship between noise frequency ranges and fault types from a storage device (e.g., the storage 150) disclosed elsewhere in this application.

TABLE 1

An exemplary relationship between noise frequencies and fault types

| Fault Type | Chain | Wheel | Crankset | Wheel Disk | Pedal |
| --- | --- | --- | --- | --- | --- |
| Frequency Range (kHz) | 2-6 | 6-10 | 10-14 | 14-18 | 18-20 |

It should be noted that the above description is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure.

FIG. 10-A is a flowchart illustrating an exemplary process 1010 for determining fault information associated with a solar panel according to some embodiments of the present disclosure. In some embodiments, the process 1010 may be executed by the vehicle sharing system 100. For example, the process 1010 may be implemented as a set of instructions (e.g., an application) stored in the ROM 230, the RAM 240, or a storage device of the vehicle 140. The processor 220 and/or the modules in FIG. 5 may execute the set of instructions and, when executing the instructions, the processor 220 and/or the modules may be configured to perform the process 1010. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 10-A and described below is not intended to be limiting.

In 1002, the detection component 470 (e.g., the obtaining module 502) may obtain a second voltage that is associated with a solar panel installed on the vehicle 140. The detection component 470 may obtain the second voltage from a voltage detector connected to the solar panel.

In 1004, the detection component 470 (e.g., the determination module 506) may determine an acquisition time of the second voltage. The acquisition time may refer to a time point when the second voltage is detected by the voltage detector.

In 1006, the detection component 470 (e.g., the determination module 506) may determine whether the acquisition time is within a predetermined time range. The predetermined time range may be default settings of the vehicle sharing system 100 or may be adjustable in different situations. For example, the predetermined time range may be relatively short (e.g., 9:30 to 17:30) in winter, otherwise, the predetermined time range may be relatively long (e.g., 8:00 to 19:00) in summer.

According to a result of the determination that the acquisition time is not within the predetermined time range, the detection component 470 may execute the process 1010 to back to step 1002 to obtain another second voltage. According to a result of the determination that the acquisition time is within the predetermined time range, the detection component 470 may execute the process 1010 to step 1008 to determine whether the second voltage is within a voltage range. The voltage range may refer to a normal voltage range output by the solar panel when the solar panel works normally.

According to a result of the determination that the second voltage is within the voltage range, the detection component 470 may execute the process 1010 to proceed to step 1002 to obtain another second voltage, that is, it may indicate that the solar panel works normally. According to a result of the determination that the second voltage is not within the voltage range, the detection component 470 may in 1010 determine fault information associated with the solar panel. The fault information may indicate that the solar panel cannot work normally. For example, an electrode in the solar panel may have been corroded, or the solar panel may be covered such that it receives little sunlight.

It should be noted that the above description is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure.

FIG. 10-B is a flowchart illustrating an exemplary process 1020 for determining fault information associated with a connection between the solar panel and the lock of the bicycle according to some embodiments of the present disclosure. In some embodiments, the process 1020 may be executed by the vehicle sharing system 100. For example, the process 1020 may be implemented as a set of instructions (e.g., an application) stored in the ROM 230, the RAM 240, or a storage device of the vehicle 140. The processor 220 and/or the modules in FIG. 5 may execute the set of instructions and, when executing the instructions, the processor 220 and/or the modules may be configured to perform the process 1020. In some embodiments, the process may be accomplished with one or more additional operations not described, and/or without one or more of the operations discussed. Additionally, the order in which the operations of the process as illustrated in FIG. 10-B and described below is not intended to be limiting.

In 1012, the detection component 470 (e.g., the obtaining module 502) may obtain a real-time level signal associated with a connection between the solar panel and the lock 410. In some embodiments, the solar panel and the lock 410 may be connected via electric wires.

In 1014, the detection component 470 (e.g., the determination module 506) may determine whether the real-time level signal differs from a reference level signal. The level signal may be collected according to a predetermined time interval (e.g., per 30 seconds). As used herein, the reference level signal may refer to a level signal collected at a prior time point.

According to a result of the determination that the real-time level signal is the same or substantially same as the reference level signal, the detection component 470 may execute the process 1020 to proceed to step 1012 to obtain a next level signal acquired at a next time point. As used herein, "substantially same" refers to that a difference between the real-time level signal and the reference level signal is less than a predetermined threshold (e.g., 0.01 V).

According to a result of the determination that the real-time level signal differs from the reference level signal, the detection component 470 may execute the process 1020 to proceed to step 1016 to determine fault information associated with the connection between the solar panel and the lock 410. It should be known that if the solar panel and the lock 410 are normally connected to each other, a level signal associated with the connection is approximately stable (e.g., stay at high level or low level). If the real-time level signal differs from the reference level signal (i.e., the level signal acquired at a prior time point), it may indicate that the level signal suddenly changes from a high level to a low level or from a low level to a high level, which may further indicate that there may be a fault associated with the connection between the solar panel and the lock 410. For example, the electric wires connecting the solar panel and the lock 410 may be broken, a contact between the electric wires and the solar panel or the lock 410 may be bad, etc.

It should be noted that the above description is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure.

Figure 11:
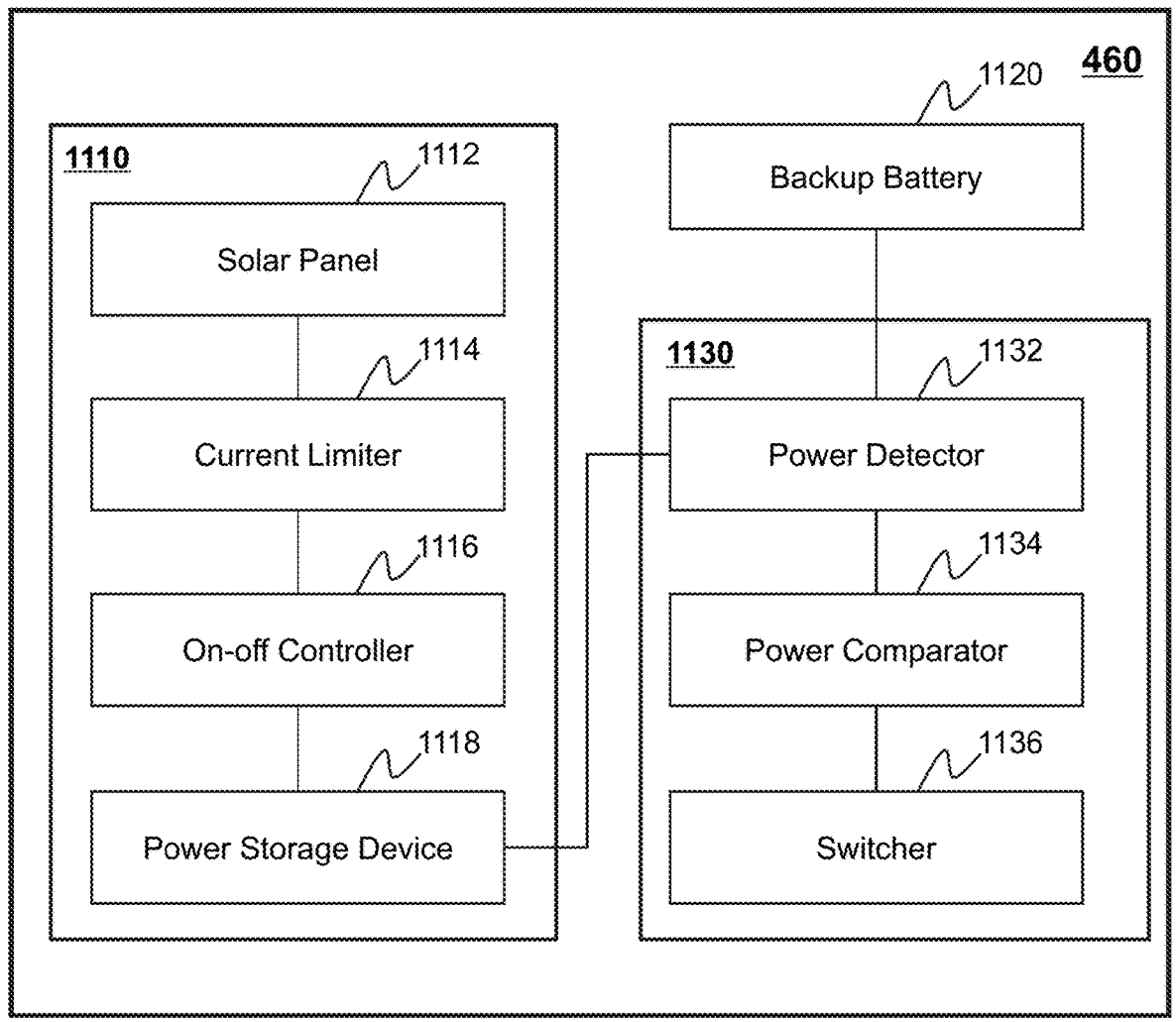
FIG. 11 is a block diagram illustrating an exemplary power supply according to some embodiments of the present disclosure.

FIG. 11 is a schematic block diagram illustrating an exemplary power supply 460 according to some embodiments of the present disclosure. The power supply 460 may include a solar generator 1110, a backup battery 1120, and a power controller 1130.

The solar generator 1110 may include a solar panel 1112, a current limiter 1114, an on-off controller 1116, and a power storage device 1118. The solar panel 1112 may be configured to convert solar energy into electric energy. The solar panel 1112 may include a rigid solar panel (e.g., a crystalline silicon solar panel), a flexible solar panel (e.g., an organic solar panel), etc. In some embodiments, the solar generator 1110 may include a plurality of solar panels and the plurality of solar panels may be connected to each other in series or parallel.

The current limiter 1114 may be configured to limit a magnitude of a charge current for the power storage device 1118. The current limiter 1114 may include a resistor, a diode, etc.

The on-off controller 1116 may be configured to control ON/OFF of a process for charging the power storage device 1118. The on-off controller 1116 may include a power detector (not shown) and an electromagnetic relay (not shown). The power detector may detect an electric quantity in the power storage device 1118 and determine whether the electric quantity reaches saturation. According to a result of the determination that the electric quantity in the power storage device 1118 reaches saturation, the electromagnetic relay may switch off a connection between the solar panel 1112 and the power storage device 1118 (i.e., stop the charging process).

The power storage device 1118 may be configured to store electric energy and charge any component (e.g., the lock 410) of the vehicle 140. The power storage device 1118 may include a storage battery, a rechargeable battery, etc.

The backup battery 1120 may be configured to provide electric energy for any component (e.g., the lock 410) of the vehicle 140 when the solar generator 1110 cannot work normally.

The power controller 1130 may be configured to control a power supply mode of the power supply 460. The power controller 1130 may include a power detector 1132, a power comparator 1134, and a switcher 1136.

The power detector 1132 may be configured to detect a first electric quantity in the power storage device 1118 and a second electric quantity in the backup battery 1120. The power comparator 1134 may be configured to compare the first electric quantity and the second electric quantity. According to a result of the determination that the first electric quantity is greater than or equal to the second electric quantity, the power comparator 1134 may transmit a first switch command to the switcher 1136. Further, according to the first switch command, the switcher 1136 may set the power supply mode of the power supply 460 as a first power supply mode in which the power storage device 1118 may be used to provide power for the components of the vehicle 140. According to a result of the determination that the first electric quantity is less than the second electric quantity, the power comparator 1134 may transmit a second switch command to the switcher 1136. Further, according to the second switch command, the switcher 1136 may set the power supply mode of the power supply 460 as a second power supply mode in which the backup battery 1120 may be used to provide power for the components of the vehicle 140.

In some embodiments, the power comparator 1134 may compare the first electric quantity in the power storage device 1118 with a threshold. According to a result of the determination that the first electric quantity is greater than or equal to the threshold, the power comparator 1134 may transmit the first switch command to the switcher 1136. Further, according to the first switch command, the switcher 1136 may set the power supply mode of the power supply 460 as the first power supply mode in which the power storage device 1118 may be used to provide power for the components of the vehicle 140. According to a result of the determination that the first electric quantity is less than the threshold, the power comparator 1134 may transmit the second switch command to the switcher 1136. Further, according to the second switch command, the switcher 1136 may set the power supply mode of the power supply 460 as the second power supply mode in which the backup battery 1120 may be used to provide power for the components of the vehicle 140.

In some embodiments, the power supply 460 may include a power indicator (not shown) installed on a component (e.g., the lock 410, a handlebar) of the vehicle 140. The power indicator may include a LED light. The power indicator may include a first power indicator connected with the power storage device 1118 and a second power indicator connected with the backup battery 1120. When the first power indicator is red, it may indicate that the first electric quantity in the power storage device 1118 is relatively low (e.g., lower than a first threshold), that is, the power storage device 1118 needs to be charged. When the first power indicator is green, it may indicate that the first electric quantity in the power storage device 1118 is relatively sufficient (e.g., larger than a second threshold). Similarly, when the second power indicator is red, it may indicate that the second electric quantity in the backup battery 1120 is relatively low (e.g., lower than a third threshold), that is, the backup battery 1120 needs to be replaced. When the second power indicator is green, it may indicate that the second electric quantity in the backup battery 1120 is relatively sufficient (e.g., larger than a fourth threshold.

FIGS. 12-A through 12-D are schematic diagram illustrating an exemplary solar generator 1110 according to some embodiments of the present disclosure.

As illustrated in FIG. 12-A, the solar panel 1112 may be placed on a fender 1212 of the vehicle 140. A shape of the solar panel 1112 may be arc shape and a cross-section of the solar panel 1112 may be "U" shaped.

As illustrated in FIG. 12-B, the solar generator 1110 may further include a controller 1216 (e.g., a combination of the current limiter 1114 and the on-off controller 1116) placed on the surface of the solar panel 1112. The controller 1216 may include an input (e.g., an electric wire) connected with the solar panel 1112 and output (e.g., an electric wire) connected to a component (e.g., the lock 410, a taillight) of the vehicle 140 or the power storage device 1118.

As illustrated in FIG. 12-C, the controller 1216 may be placed on a concave side of the fender 1212. The input of the controller 1216 may pass through a hole 1217 in the fender 1212 and further connect the controller 1216 and the solar panel 1112. In some embodiments, the controller 1216 may be fixed on the concave surface of the fender 1212 by a screw or a binder.

As illustrated in FIG. 12-D, the solar generator 1110 may include a board 1218 that may be used to protect the solar panel 1112. The board 1218 may be a transparent board. As illustrated, the board 1218 may be fixed on a convex side of the solar panel 1112 by a screw or a binder. A shape of the board 1218 may be arc shape, and a curvature of the board 1218 may be larger than that of the solar panel 1112.

As illustrated in FIG. 12-E, the solar generator 1110 may be used to provide power for the lock 410. For example, the output (e.g., an electric wire) of the controller 1216 may be connected to the lock 410, and current may be transmitted from the solar generator 1110 to the lock 410 via the electric wire.

FIGS. 13-A and 13-B are schematic diagrams illustrating an exemplary solar panel 1112 according to some embodiments of the present disclosure.

As illustrated in FIG. 13-A, the solar panel 1112 may include a first optical waveguide component 1311 and a second optical waveguide component 1312. The first optical waveguide component 1311 may be placed opposite to the second optical waveguide component 1312 and the first optical waveguide component 1311 may be parallel to the second optical waveguide component 1312. Side surfaces of the first optical waveguide component 1311 and side surfaces of the second optical waveguide component 1312 may be tight coupled via solar cells 1313.

In some embodiments, a surface of the first optical waveguide component 1311 facing towards the second optical waveguide component 1312 may be coated with a first fluorescent layer 1314 and a surface of the second optical waveguide component 1312 facing towards the first optical waveguide component 1311 may be coated with a second fluorescent layer 1315. The thickness of the first fluorescent layer 1314 or thickness of the second fluorescent layer 1315 may be in a range of 2 nm to 100 nm. In some embodiments, the thickness of the first fluorescent layer 1314 or thickness of the second fluorescent layer 1315 may be restricted to a subrange of 2-5 nm, 5-10 nm, 10-20 nm, 20-50 nm, or 50-100 nm The first fluorescent layer 1314 and the second fluorescent layer 1315 may be films fabricated from fluorescent materials. The fluorescent materials may include inorganic fluorescent materials and organic fluorescent materials. The inorganic fluorescent materials may include rare earth phosphors, inorganic semiconductor phosphors, quantum dots, etc. The organic fluorescent materials may include small molecular luminescent materials, macromolecular luminescent materials, etc.

In some embodiments, there may be a gap between the first optical waveguide component 1311 and the second optical waveguide component 1312. The gap may be filled with vacuum, air, inert gas, etc. The width of the gap may be default settings (e.g., in a range of 5 mm to 20 mm) of the system 100 or may be adjustable in different situations. In some embodiments, the first optical waveguide component 1311 and the second optical waveguide component 1312 may be made of polygonal plate glasses with the same size. The thicknesses of the first optical waveguide component 1311 or the thickness of the second optical waveguide component 1312 may be in a range of 2 to 6 mm.

As illustrated in FIG. 13-B, the solar panel 1112 may include a double-sided solar plate 1316, two tempered glasses 1317, and one or more reflectors 1318. The two tempered glasses 1317 are fixed on an upward side and a downward side of the solar plate 1316 by binder respectively. The one or more reflectors may reflect sunlight to the double-sided solar plate 1316. The shape of the reflector may include triangle, rectangle, circle, irregular shape, etc.

FIGS. 14-A through 14-D are schematic diagrams illustrating an exemplary induction generator 1400 according to some embodiments of the present disclosure. In some embodiments, the induction generator 1400 may be placed on a wheel hub or a wheel fork of the vehicle 140.

As illustrated in FIG. 14-A, the induction generator 1400 may include a housing 1410, a rotor 1420, a stator 1430, and a cover 1440. The housing 1410 and the cover 1440 may be configured to protect the rotor 1420 and the stator 1430. The shape of the housing 1410 may be cylinder, and the material of the housing 1410 may include polycarbonate (PC), acrylonitrile-butadiene-styrene (ABS), etc. In some embodiments, the cover 1440 may have one or more holes (not shown) via which induction coils may be connected to a component (e.g., the lock 410) of the vehicle 140 or a power storage device using electric wires.

The rotor 1420 and the stator 1430 may be connected to each other via a bearing 1450. The bearing 1450 may include an inner ring (not shown) connected with the stator 1430 and an outer ring (not shown) connected to the rotor 1420.

The rotor 1420 may include a magnet holder 1422, a magnet 1424, and a coil structure 1426. The magnet 1424 may include one or more (e.g., 6, 8, 12) permanent magnets with an arc shape. For each of the one or more permanent magnets, magnetic induction lines point to the center of the permanent magnet along a radial direction. In some embodiments, the one or more permanents may be placed on (e.g., adhered to) the outside of the magnet holder 1422. In some embodiments, the one or more permanents may be uniformly (i.e., a distance between any two adjacent permanents is uniform) placed on the outside of the magnet holder 1422. In some embodiments, the one or more permanents may be randomly placed on the outside of the magnet holder 1422.

The stator 1430 may include a magnetic core. The material of the magnetic core may include silicon steel, Fe—Si—Al alloy, Fe-based amorphous alloy, ferrosoferric oxide, etc.

As illustrated in FIG. 14-B, the magnet holder 1422 may include a baseboard 1422-1 and a magnet fixing part 1422-2. The magnet fixing part 1422-2 may be used to fix the magnet 1424. The baseboard 1422-1 includes a bayonet 1422-3 that may be connected with the outer ring of the bearing 1450. A diameter of the bayonet 1422-3 is larger than that of the out ring of the bearing 1450 by 1 mm-3 mm, resulting in that the bearing 1450 can be struck in the bayonet 1422-3. In some embodiments, the bearing 1450 may be fixed in the bayonet 1422-3 by an adhesive connection.

As illustrated in FIG. 14-C, the coil structure 1426 may include a first circle 1426-1, a second circle 1426-2, and one or more supports 1426-3. The first circle 1426-1 and the second circle 1426-2 may be coaxial. It can be seen from FIG. 14-A that a diameter of the first circle 1426-1 is larger than that of the stator 1430. For example, the diameter of the first circle 1426-1 may be larger than the diameter of the stator 1430 by 0.5 to 3 mm. The second circle 1426-2 may include one or more arc slices (e.g., "M" illustrated in FIG. 14-C). The one or more supports 1426-3 may be used to support the first circle 1426-1 and the second circle 1426-2. A number of the one or more supports 1426-3 may be the same as a number of the one or more arc slices. The thickness of each of the one or more supports 1426-3 may be in a range of 1 to 3 mm.

In some embodiments, a length of the first circle 1426-1 is the same as a length of each of the one or more arc slices. A length of each of the one or more supports 1426-2 may be shorter than the length of the first circle 1426-1. For example, the length of each of the one or more supports 1426-2 may be two-thirds of the length of the first circle 1426-1.

As illustrated in FIG. 14-D, the second circle 1426-2 includes 12 arc slices (e.g., "1"~"12") and 12 corresponding supports 1426-3 that are winded with 3 induction coils (e.g., a, b, c). For example, the induction coil a winds along the arc slices "3," "6," "9," and "12." The induction coil b winds along the arc slices "2," "5," "8," and "11." The induction coil c winds long the arc slices "1," "4," "7," and "10." The induction coils may be used to output electricity via an output (e.g., an electric wire). When the induction coils are used to output two-phase electricity, a number of the electric wires may be 4; while when the induction coils are used to output three-phase electricity, a number of the electric wires may be 6.

FIGS. 15-A through 15-C are schematic diagrams illustrating an exemplary structure of the lock 410 according to some embodiments of the present disclosure. The lock 410 may include a lock body 1510, an integrated circuit board 1520, a controller 1530, a connector 1540, and a wireless communicator 1550.

As illustrated in FIG. 15-A, the controller 1530 may be placed on the integrated circuit board 1520 and detachably connected with the wireless communicator 1550 via the connector 1540 (e.g., a socket connector).

As illustrated in FIG. 15-B, the connector 1540 may include a first connecting part 1542 and a second connecting part 1544. The first connecting part 1542 may be placed on the integrated circuit board 1520 and connected to the controller 1530 via electrical wires. The second connecting part 1544 may be connected with the wireless communicator 1550.

As illustrated in FIG. 15-C, the lock 410 may also include an infrared receiver 1562 and an infrared transmitter 1564. The infrared receiver 1562 may be fixed to the first connecting part 1542 and the infrared transmitter 1564 may be fixed on the second connecting part 1544. Alternatively or additionally, the infrared receiver 1562 may be fixed on the second connecting part 1544, and the infrared transmitter 1564 may be fixed to the first connecting part 1542.

In some embodiments, the infrared transmitter 1564 may be configured to transmit an infrared signal. The infrared receiver 1562 may be configured to obtain the infrared signal and transmit a feedback signal indicating whether the infrared receiver 1562 receives the infrared signal to the controller 1530. According to a result of the determination that the infrared receiver 1562 doesn't receive the infrared signal, which may indicate that the wireless communicator 1550 may have been separated with the controller 1530, the controller 1530 may control the lock 410 to lock the vehicle 140. In some embodiments, the lock 410 may also include an alertor (not shown) connected to the controller 1530. According to a result of the determination that the infrared receiver 1562 doesn't receive the infrared signal, the alertor may generate an alert (e.g., an alarm tone, a variation, a light).

Figure 16:
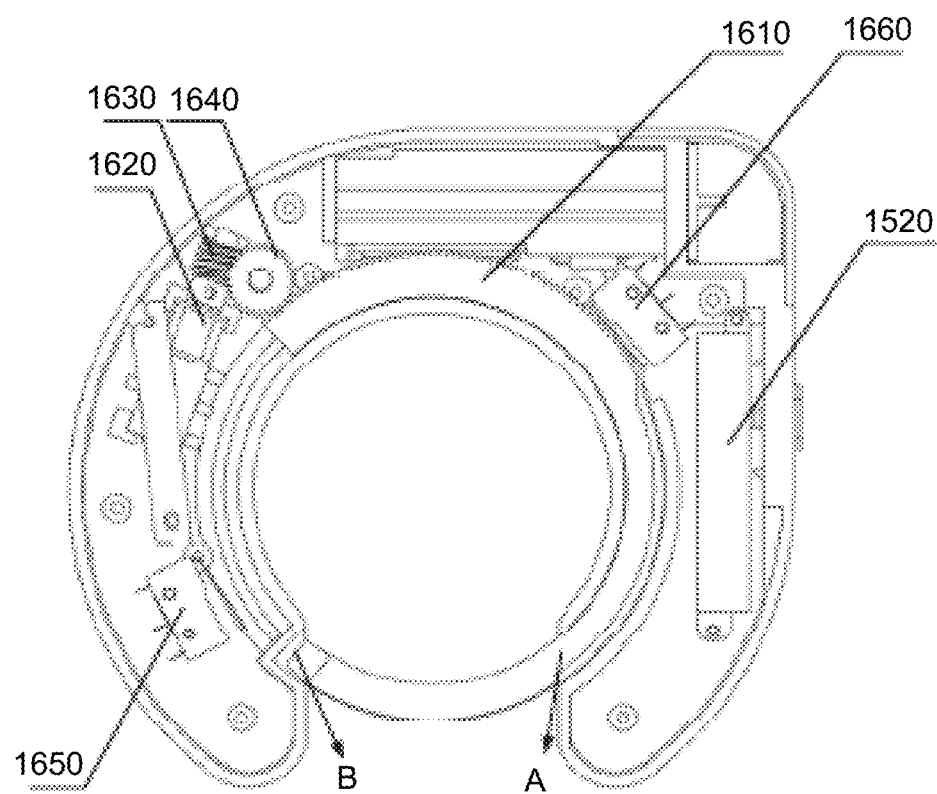
FIG. 16 is a schematic diagram illustrating an exemplary structure of a lock according to some embodiments of the present disclosure.

FIG. 16 is schematic diagrams illustrating an exemplary structure of the lock 410 according to some embodiments of the present disclosure. The structure of the lock 410 may include a lock tongue 1610, a motor 1620, a worm 1630, and a worm gear 1640. Position "A" refers to an exit of the lock tongue 1610 and position "B" refers to an "OFF" position of the lock 410.

In some embodiments, the lock 410 may receive an unlocking instruction via the communication component 440. The communication component 440 may determine an unlocking signal based on the unlocking instruction and transmit the unlocking signal to the motor 1620. After receiving the unlocking signal, the motor 1620 may rotate its output shaft, driving the worm 1630 to rotate along a first unlocking direction and simultaneously driving the worm gear 1640 to rotate along a second unlocking direction, wherein the first unlocking direction may be perpendicular to the second unlocking direction. The rotating worm gear 1640 may further drive the lock tongue 1610 to move from position "B" to position "A" through gear mesh, thereby unlocking the lock 410.

In some embodiments, the lock 410 may receive a locking instruction via the communication component 440. The communication component 440 may determine a locking signal based on the locking instruction and transmit the locking signal to the motor 1620. In some embodiments, the lock 410 may receive a manual locking operation on a locking button (not shown) from a requestor. After receiving the locking signal or the locking operation, the motor 1620 may rotate its output shaft, driving the worm 1630 to rotate along a first locking direction and simultaneously driving the worm gear 1640 to rotate along a second locking direction, wherein the first locking direction may be perpendicular to the second locking direction. The rotating worm gear 1640 may further drive the lock tongue 1610 to move from position "A" to position "B" through gear mesh, thereby locking the lock 410. The first locking direction may be opposite to the first unlocking direction and the second locking direction may be opposite to the second unlocking direction.

In some embodiments, the lock 410 may include an unlocking detector (e.g., a first micro-switch 1650) and a locking detector (e.g., a second micro-switch 1660). The first micro-switch 1650 may include a first contact point (not shown) and the second micro-switch 1660 may include a second contact point (not shown). In some embodiments, the first micro-switch 1650 may detect whether the lock 410 is opened. For example, if the first micro-switch 1650 detects that the lock tongue 1610 contacts with the first contact point, the lock 410 may be opened. Similarly, the second micro-switch 1660 may detect whether the lock 410 is closed. For example, if the second micro-switch 1660 detects that the lock tongue 1610 contacts with the second contact point, the lock 410 may be closed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable medium having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:
1. A system, comprising:
   a storage device storing a set of instructions;
   a processor in communication with the storage device, wherein when executing the set of instructions, the processor is configured to cause the system to:

obtain real-time information associated with a bicycle;
obtain reference information associated with the bicycle, wherein the real-time information and the reference information include at least one of groups:
  a first voltage detected by a voltage detector from a power supply installed on a wheel of the bicycle and a reference voltage that is associated with the wheel of the bicycle;
  a second voltage that is associated with a solar panel installed on the bicycle and a voltage range that is associated with the solar panel; or
  a real-time level signal associated with a connection between the solar panel and a lock of the bicycle and a reference level signal that is associated with the connection between the solar panel and the lock of the bicycle;
determine, based on the real-time information and the reference information, abnormal information associated with the bicycle, the abnormal information including at least one of deformation information of the wheel of the bicycle, fault information of the solar panel installed on the bicycle, or fault information of the connection between the solar panel and the lock of the bicycle; and
transmit the abnormal information to a server or a terminal device associated with the bicycle according to a Narrow Band Internet of Things (NB-IoT) technique or a Long Range (LoRa) technique.

2. The system of claim 1, wherein:
the real-time information includes the first voltage detected by the voltage detector from the power supply installed on the wheel of the bicycle,
the reference information includes the reference voltage that is associated with the wheel of the bicycle,
the abnormal information includes the deformation information associated with the wheel of the bicycle, and
to determine, based on the real-time information and the reference information, the abnormal information, the processor is configured to cause the system to:
  determine whether a difference between the first voltage and the reference voltage is equal to or larger than a threshold voltage; and
  determine, based on a result of the determination that the difference between the first voltage and the reference voltage is equal to or larger than the threshold voltage, the deformation information associated with the wheel of the bicycle based on the difference between the first voltage and the reference voltage.

3. The system of claim 1, wherein:
the real-time information includes the second voltage that is associated with the solar panel installed on the bicycle,
the reference information includes the voltage range that is associated with the solar panel,
the abnormal information includes the fault information associated with the solar panel, and
to determine, based on the real-time information and the reference information, the abnormal information, the processor is configured to cause the system to:
  determine an acquisition time of the second voltage;
  determine whether the acquisition time is within a predetermined time range;
  determine, based on a result of the determination that the acquisition time is within the predetermined time range, whether the second voltage is within the voltage range; and
  determine, based on a result of the determination that the second voltage is within the voltage range, the fault information associated with the solar panel.

4. The system of claim 1, wherein:
the real-time information includes the real-time level signal associated with the connection between the solar panel and the lock of the bicycle,
the reference information includes the reference level signal associated with the connection between the solar panel and the lock of the bicycle,
the abnormal information includes the fault information associated with the connection between the solar panel and the lock of the bicycle, and
to determine, based on the real-time information and the reference information, the abnormal information, the processor is configured to cause the system to:
  determine whether the real-time level signal differs from the reference level signal; and
  determine, based on a result of the determination that the real-time level signal differs from the reference level signal, the fault information associated with the connection between the solar panel and the lock of the bicycle.

5. The system of claim 1, wherein:
the real-time information further includes noise information associated with the bicycle,
the reference information further includes a relationship between frequency ranges and fault types associated with the bicycle,
the abnormal information further includes a fault type associated with the bicycle, and
to determine, based on the real-time information and the reference information, the abnormal information, the processor is configured to cause the system to:
  determine, based on the noise information, a noise frequency; and
  determine, based on the noise frequency and the relationship between frequency ranges and fault types, the fault type associated with the bicycle.

6. The system of claim 1, wherein the processor is further configured to cause the system to:
output the abnormal information via a voice broadcast, a visual display, or an indicator.

7. A method implemented on a computing device having a processor, a storage medium, and a communication platform connected to a network, the method comprising:
obtaining real-time information associated with a bicycle;
obtaining reference information associated with the bicycle, wherein the real-time information and the reference information include at least one of groups:
  a first voltage detected by a voltage detector from a power supply installed on a wheel of the bicycle and a reference voltage that is associated with the wheel of the bicycle;
  a second voltage that is associated with a solar panel installed on the bicycle and a voltage range that is associated with the solar panel; or
  a real-time level signal associated with a connection between the solar panel and a lock of the bicycle and a reference level signal that is associated with the connection between the solar panel and the lock of the bicycle;
determining, based on the real-time information and the reference information, abnormal information associated with the bicycle, the abnormal information including at least one of deformation information of the wheel of the bicycle, fault information of the solar panel installed on the bicycle, or fault information of the connection between the solar panel and the lock of the bicycle; and transmitting the abnormal information to a server or a terminal device associated with the bicycle according to a Narrow Band Internet of Things (NB-IoT) technique or a Long Range (LoRa) technique.

8. The method of claim 7, wherein:
the real-time information includes the first voltage detected by the voltage detector from the power supply installed on the wheel of the bicycle,
the reference information includes the reference voltage that is associated with the wheel of the bicycle,
the abnormal information includes the deformation information associated with the wheel of the bicycle, and
the determining, based on the real-time information and the reference information, the abnormal information includes:
   determining whether a difference between the first voltage and the reference voltage is equal to or larger than a threshold voltage; and
   determining, based on a result of the determination that the difference between the first voltage and the reference voltage is equal to or larger than the threshold voltage, the deformation information associated with the wheel of the bicycle based on the difference between the first voltage and the reference voltage.

9. The method of claim 7, wherein:
the real-time information includes the second voltage that is associated with the solar panel installed on the bicycle,
the reference information includes the voltage range that is associated with the solar panel,
the abnormal information includes the fault information associated with the solar panel, and
the determining, based on the real-time information and the reference information, the abnormal information includes:
   determining an acquisition time of the second voltage;
   determining whether the acquisition time is within a predetermined time range;
   determining, based on a result of the determination that the acquisition time is within the predetermined time range, whether the second voltage is within the voltage range; and
   determining, based on a result of the determination that the second voltage is within the voltage range, the fault information associated with the solar panel.

10. The method of claim 7, wherein:
the real-time information includes the real-time level signal associated with the connection between the solar panel and the lock of the bicycle,
the reference information includes the reference level signal associated with the connection between the solar panel and the lock of the bicycle,
the abnormal information includes the fault information associated with the connection between the solar panel and the lock of the bicycle, and
the determining, based on the real-time information and the reference information, the abnormal information includes:
   determining whether the real-time level signal differs from the reference level signal; and
   determining, based on a result of the determination that the real-time level signal differs from the reference level signal, the fault information associated with the connection between the solar panel and the lock of the bicycle.

11. The method of claim 7, wherein:
the real-time information further includes noise information associated with the bicycle,
the reference information further includes a relationship between frequency ranges and fault types associated with the bicycle,
the abnormal information further includes a fault type associated with the bicycle, and
the determining, based on the real-time information and the reference information, the abnormal information includes:
   determining, based on the noise information, a noise frequency; and
   determining, based on the noise frequency and the relationship between frequency ranges and fault types, the fault type associated with the bicycle.

12. The method of claim 7, wherein the method further includes:
outputting the abnormal information via a voice broadcast, a visual display, or an indicator.

13. A system, comprising:
a storage device storing a set of instructions;
a processor in communication with the storage device, wherein when executing the set of instructions, the processor is configured to cause the system to:
   obtain real-time information associated with a bicycle;
   obtain reference information associated with the bicycle, wherein the real-time information and the reference information include at least one of groups:
      a first voltage detected by a voltage detector from a power supply installed on a wheel of the bicycle and a reference voltage that is associated with the wheel of the bicycle;
      a second voltage that is associated with a solar panel installed on the bicycle and a voltage range that is associated with the solar panel; or
      a real-time level signal associated with a connection between the solar panel and a lock of the bicycle and a reference level signal that is associated with the connection between the solar panel and the lock of the bicycle;
   determine, based on the real-time information and the reference information, abnormal information associated with the bicycle, the abnormal information including at least one of deformation information of the wheel of the bicycle, fault information of the solar panel installed on the bicycle, or fault information of the connection between the solar panel and the lock of the bicycle; and
   transmit the abnormal information to the bicycle or a terminal device according to a Narrow Band Internet of Things (NB-IoT) technique or a Long Range (LoRa) technique.

14. The system of claim 13, wherein:
the real-time information includes the first voltage detected by the voltage detector from the power supply installed on the wheel of the bicycle,
the reference information includes the reference voltage that is associated with the wheel of the bicycle,
the abnormal information includes the deformation information associated with the wheel of the bicycle, and
to determine, based on the real-time information and the reference information, the abnormal information, the processor is configured to cause the system to:

determine whether a difference between the first voltage and the reference voltage is equal to or larger than a threshold voltage; and determine, based on a result of the determination that the difference between the first voltage and the reference voltage is equal to or larger than the threshold voltage, the deformation information associated with the wheel of the bicycle based on the difference between the first voltage and the reference voltage.

15. The system of claim 13, wherein:

the real-time information includes the second voltage that is associated with the solar panel installed on the bicycle, the reference information includes the voltage range that is associated with the solar panel, the abnormal information includes the fault information associated with the solar panel, and to determine, based on the real-time information and the reference information, the abnormal information, the processor is configured to cause the system to:

determine an acquisition time of the second voltage;

determine whether the acquisition time is within a predetermined time range;

determine, based on a result of the determination that the acquisition time is within the predetermined time range, whether the second voltage is within the voltage range; and determine, based on a result of the determination that the second voltage is within the voltage range, the fault information associated with the solar panel.

16. The system of claim 13, wherein:

the real-time information includes the real-time level signal associated with the connection between the solar panel and the lock of the bicycle, the reference information includes the reference level signal associated with the connection between the solar panel and the lock of the bicycle, the abnormal information includes the fault information associated with the connection between the solar panel and the lock of the bicycle, and to determine, based on the real-time information and the reference information, the abnormal information, the processor is configured to cause the system to:

determine whether the real-time level signal differs from the reference level signal; and determine, based on a result of the determination that the real-time level signal differs from the reference level signal, the fault information associated with the connection between the solar panel and the lock of the bicycle.

17. The system of claim 13, wherein:

the real-time information further includes noise information associated with the bicycle, the reference information further includes a relationship between frequency ranges and fault types associated with the bicycle, the abnormal information further includes a fault type associated with the bicycle, and to determine, based on the real-time information and the reference information, the abnormal information, the processor is configured to cause the system to:

determine, based on the noise information, a noise frequency; and determine, based on the noise frequency and the relationship between frequency ranges and fault types, the fault type associated with the bicycle.

18. The system of claim 13, wherein the processor is further configured to cause the system to:

output the abnormal information via a voice broadcast, a visual display, or an indicator.

* * * * *